United States Patent
Rose

(10) Patent No.: US 11,162,864 B2
(45) Date of Patent: Nov. 2, 2021

(54) DETECTOR AND METHODS OF DETECTING

(71) Applicant: Rosemount Measurement Limited, London (GB)

(72) Inventor: Darren Michael Rose, Wimborne (GB)

(73) Assignee: Rosemount Measurement Limited, London (GB)

( * ) Notice: Subject to any disclaimer, the term of this patent is extended or adjusted under 35 U.S.C. 154(b) by 246 days.

(21) Appl. No.: 16/140,172

(22) Filed: Sep. 24, 2018

(65) Prior Publication Data

US 2019/0025149 A1   Jan. 24, 2019

Related U.S. Application Data

(63) Continuation of application No. 14/609,994, filed on Jan. 30, 2015, now Pat. No. 10,082,440, which is a continuation of application No. 13/054,062, filed as application No. PCT/GB2009/050869 on Jul. 16, 2009, now Pat. No. 9,074,963.

(51) Int. Cl.
*G01M 3/24* (2006.01)
*G01H 11/08* (2006.01)

(52) U.S. Cl.
CPC ............ *G01M 3/243* (2013.01); *G01H 11/08* (2013.01)

(58) Field of Classification Search
CPC ...................................................... G01M 3/24
See application file for complete search history.

(56) References Cited

U.S. PATENT DOCUMENTS

| | | | |
|---|---|---|---|
| 3,437,851 A | 4/1969 | Cady | |
| 3,517,546 A * | 6/1970 | Fraser | G01N 29/14 73/40.5 R |
| 3,805,596 A | 4/1974 | Klahr | |
| 4,046,220 A * | 9/1977 | Glenn, Jr. | G01M 3/24 181/105 |
| 4,088,907 A | 5/1978 | Jones et al. | |
| 4,176,543 A * | 12/1979 | Nolte | G01M 3/24 73/40.5 A |
| 4,282,453 A | 8/1981 | Knight et al. | |
| 4,287,581 A * | 9/1981 | Neale, Sr. | G01M 3/24 367/135 |

(Continued)

FOREIGN PATENT DOCUMENTS

| | | | |
|---|---|---|---|
| CH | 467446 A * | 1/1969 | ............ F16L 55/28 |
| DE | 10341900 A1 | 6/2004 | |

(Continued)

OTHER PUBLICATIONS

International Search Report, International Application No. PCT/GB2009/050869, dated Dec. 17, 2010 (13 pages).

(Continued)

*Primary Examiner* — David A. Rogers
(74) *Attorney, Agent, or Firm* — Lewis Rice LLC

(57) ABSTRACT

An ultrasonic detector suitable for mounting in a position for surveying an area for a source of airborne ultrasound, which detector comprises a sensor for detecting an ultrasonic sound signal, characterised by a transducer configured to produce a broadband ultrasonic sound signal for reception by said sensor enabling said ultrasonic detector to perform a self-test.

14 Claims, 25 Drawing Sheets

(56) References Cited

U.S. PATENT DOCUMENTS

| | | | | |
|---|---|---|---|---|
| 4,416,145 A * | 11/1983 | Goodman | | G01M 3/24 73/40.5 A |
| 4,457,163 A * | 7/1984 | Jackie | | G01N 29/14 73/40.5 A |
| 4,502,322 A * | 3/1985 | Tero | | G01M 3/24 73/40.5 A |
| 4,571,994 A * | 2/1986 | Dickey | | F15B 19/00 73/168 |
| 4,677,337 A | 6/1987 | Kleinschmidt et al. | | |
| 4,823,600 A | 4/1989 | Biegel et al. | | |
| 4,858,462 A * | 8/1989 | Coulter | | G01M 3/243 73/40.5 A |
| 4,901,576 A * | 2/1990 | Rademacher | | G01M 3/24 73/588 |
| 5,089,997 A * | 2/1992 | Pecukonis | | G01H 3/00 367/116 |
| 5,432,755 A * | 7/1995 | Komninos | | G01H 3/12 367/135 |
| 5,436,556 A * | 7/1995 | Komninos | | G01H 3/06 324/76.23 |
| 5,533,383 A | 7/1996 | Greene et al. | | |
| 5,557,969 A * | 9/1996 | Jordan | | G01H 3/08 73/40.5 A |
| 5,710,377 A * | 1/1998 | Youngquist | | G01H 3/00 73/40.5 A |
| 5,780,724 A * | 7/1998 | Olender | | G01M 3/38 73/24.01 |
| 6,058,076 A * | 5/2000 | Komninos | | G01H 1/00 367/135 |
| 6,234,021 B1 * | 5/2001 | Piety | | G01H 1/00 73/592 |
| 6,250,162 B1 | 6/2001 | Amaike et al. | | |
| 6,299,580 B1 | 10/2001 | Asafusa | | |
| 6,453,247 B1 * | 9/2002 | Hunaidi | | G01M 3/243 702/51 |
| 6,520,019 B1 | 2/2003 | Schon et al. | | |
| 6,647,761 B2 * | 11/2003 | Barjesteh | | G01M 3/228 73/31.05 |
| 6,725,705 B1 * | 4/2004 | Huebler | | G01M 3/243 702/51 |
| 7,051,577 B2 * | 5/2006 | Komninos | | G01M 3/24 73/40.5 A |
| 7,203,323 B2 | 4/2007 | Tashev | | |
| 7,318,335 B2 * | 1/2008 | Olesen | | G01M 3/243 73/1.02 |
| 7,770,999 B2 * | 8/2010 | Edwards | | G01M 3/24 347/19 |
| 8,096,167 B2 * | 1/2012 | Kaji | | G01M 3/243 73/40.5 R |
| 8,468,874 B2 * | 6/2013 | Komninos | | G01J 5/0859 73/40 |
| 9,786,033 B2 * | 10/2017 | Komninos | | G01D 7/00 |
| 10,739,313 B2 * | 8/2020 | Hermann | | G01N 29/4427 |
| 2006/0191341 A1 | 8/2006 | Olesen et al. | | |
| 2007/0041274 A1 | 2/2007 | Shertukde et al. | | |
| 2007/0112528 A1 * | 5/2007 | Farrell | | G01M 3/24 702/51 |
| 2007/0163364 A1 | 7/2007 | Haridas | | |
| 2007/0205373 A1 | 9/2007 | Komblau et al. | | |
| 2008/0072675 A1 | 3/2008 | Okuda et al. | | |
| 2008/0168841 A1 | 7/2008 | Matsuo | | |
| 2008/0224567 A1 | 9/2008 | Sugiura et al. | | |
| 2008/0307888 A1 | 12/2008 | Yoshioka et al. | | |
| 2009/0060246 A1 | 3/2009 | Baliga et al. | | |

FOREIGN PATENT DOCUMENTS

| | | | | |
|---|---|---|---|---|
| EP | 1522839 A1 | 4/2005 | | |
| GB | 1121824 A * | 7/1968 | | F17D 5/06 |
| GB | 1194316 | 6/1970 | | |
| GB | 2176604 A | 12/1986 | | |
| JP | 63157031 A * | 6/1988 | | G01M 3/243 |
| JP | 03029831 A * | 2/1991 | | |
| JP | H11-266498 | 9/1999 | | |
| JP | 2006352829 A | 12/2006 | | |
| WO | WO-2004104570 A1 * | 12/2004 | | G01M 3/243 |
| WO | 2006015604 A1 | 2/2006 | | |

OTHER PUBLICATIONS

Search Report, Great Britain Application No. GB0813014.8, dated Nov. 28, 2008 (4 pages).

Gassonic 1701 Product Data Sheet, "Gassonic 1701—Portable Test and Calibration Unit", Innova Gassonic, Available from: http://web.archive.org/web/20060511001220/www.gassonic.com/files/pdf/Gassonic+1701+Product+Data.pdf, dated 2006 (3 pages).

Gassonic Observer Product Data Sheet, "Gassonic Observer Ultrasonic Gas Leak Detector", Gassonic A/S, Available from: http://gassonic.com/uploads/media/senssonic_self-test_failsafe_operation.pdf, dated 2007 (6 pages).

Extended European Search Report, European Patent Application No. 1317323.2, dated Oct. 8, 2013 (4 pages).

European Search Report, European Patent Application No. 15150189, dated Feb. 24, 2015 (5 pages).

Littrell, Robert John, "High Performance Piezoelectric MEMS Microphones," 2010, accessed at https://deepblue.lib.umich.edu/bitstream/handle/2027.42/75833/rlittrel_1.pdf (111 pages).

* cited by examiner

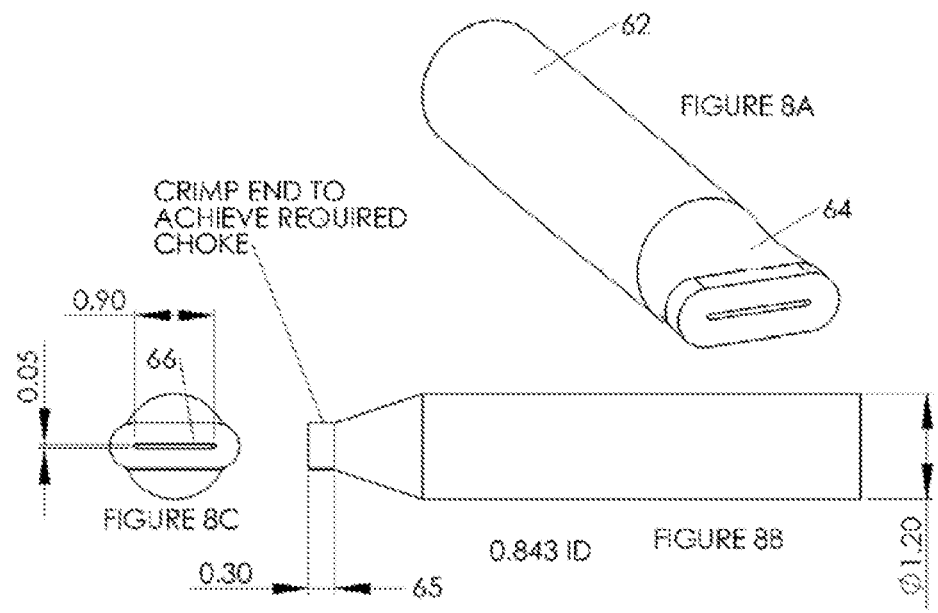
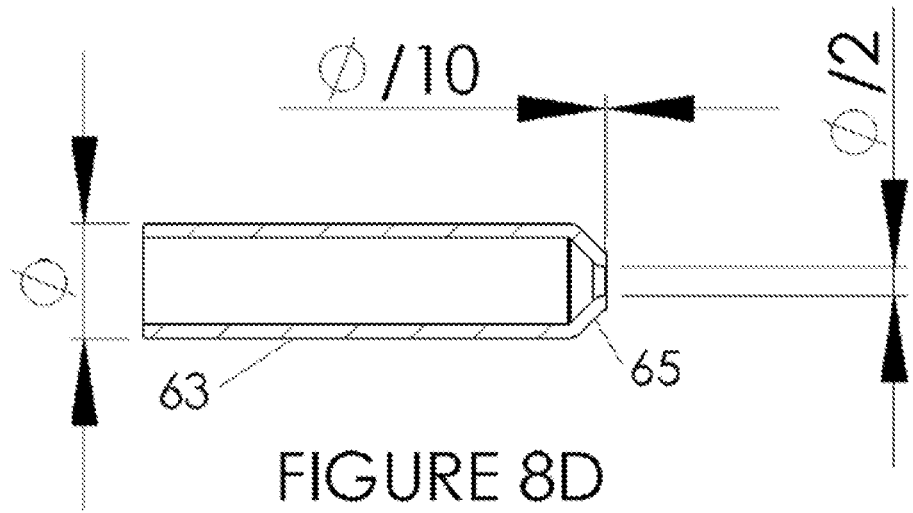

DETECTOR AND METHODS OF DETECTING

CROSS REFERENCE TO RELATED APPLICATION(S)

This application is a Continuation of U.S. Utility patent application Ser. No. 14/609,994 filed Jan. 30, 2015, which is a Continuation of U.S. Utility patent application Ser. No. 13/054,062, filed Jan. 13, 2011, which is in turn a § 317 U.S. National Phase of International Application Serial No.: PCT/GB2009/050869 filed Jul. 16, 2009, which in turn claims priority to British Application Serial No: 0813014.8 filed Jul. 16, 2008. The entire disclosure of all the above documents is herein incorporated by reference.

BACKGROUND

1. Field of the Invention

The present invention relates to an ultrasonic detector for detecting airborne ultrasound and in certain aspects to an ultrasonic detector for detecting high-pressure gas leaks, to methods of surveying an area for a source of airborne ultrasound, to an ultrasonic sensor and to a detector comprising such a sensor.

2. Description of the Related Art

Many industrial operations, such as well drilling, oil production, oil refining and industrial gas production, utilise piping to move a wide variety of high-pressure fluids such as gas and liquids. The pipes move such fluids for operating and controlling industrial processes amongst other things. Frequently the fluids that are piped are potentially explosive and the piping requires careful monitoring for leaks; leaks are required to be identified quickly to enable the appropriate remedial action to be taken.

Other industrial operations involving pressurised gas or those incorporating rotating parts may also produce ultrasound. In the latter case the ultrasound is due to mechanical wear of bearings or stressed components for example. Existing methods to detect such ultrasound use sensors mechanically coupled to machinery to detect vibration through the housing. However, when assemblies have multiple stress points the number of sensors required to detect wear can become prohibitive for cost reasons.

At industrial plants most man-made noise occurs in the acoustic range, whereas a pressurised gas leak produces a sound signal which spans the acoustic and ultrasonic ranges. In particular, the sound signal produced by a gas leak extends into the lower part of the ultrasonic frequency range from about 20 kHz up to about 80 kHz. The amplitude of the sound signal is a function of the size of leak, pressure in the pipe upstream and downstream of leak point, density and temperature of the leaking gas, and the temperature of the environment the gas escapes into. Although the spectra produced by two gas leaks are never identical, the one characteristic shared by the spectra of different gas leaks is that the sound signal is of a broadband type with a gradually decreasing intensity with increasing frequency. This characteristic has made gas leaks susceptible of detection.

Gas leak detectors have been devised which measure the airborne sound pressure waves generated by the turbulent flow when a gas escapes from a high to low pressure. Typically these detectors are mounted at an industrial site in a fixed position (for example on a pole or on a wall about 3 m above ground level) in order to survey a particular part of the plant. Normally several such detectors are used around the plant to ensure all important pipes, etc. are monitored.

The sensing range of such detectors is typically in the ultrasonic frequency range (25 kHz to 80 kHz for example) in order to eliminate most acoustic noise which might otherwise trigger a false alarm. An alarm level is set at some point above peak background noise level in the sensing range measured at the position where the detector is to be installed. For example, current guidelines specify that the alarm level should be approximately 6 dB above the peak background noise level. This is presently done on an installation-by-installation basis by mapping the area of interest prior to installation or by monitoring the detector output after installation. An additional precaution against false alarms is to build a time delay into the alarm circuit; two requirements must then be met to trigger an alarm: the sound pressure level of the detected ultrasonic sound must be both of a certain magnitude and duration. In this way most short-term ultrasonic sound spikes (caused by whistles, metal tags, hammering etc.) are ignored by the detector.

A further requirement is that detectors must have a means of self-test to ensure functionality and achieve Safety Integrity Levels (SIL) appropriate to pressurised gas leaks. This is currently achieved in one of two ways.

An example of the first type of self-test is described in EP 1 522 839. An externally mounted piezoelectric transducer is used to generate at predetermined intervals and for a predetermined time either a single frequency or narrowband test signal within the frequency sensing range of the detector. A microphone receives the test signal and checks whether it falls within a given tolerance range. An alert signal is generated if it does not. The narrow cone of sensitivity in front of the microphone requires that both the microphone and piezoelectric transducer to be mounted on the outside of the enclosure of the detector. Since the piezoelectric transducer and microphone are exposed to the environment, there is a problem of environmentally forced drift (explained in greater detail below), which may trigger a false alarm.

If the drift is caused by a solid build up (ice, dust etc.) on the microphone, the amplitude of the test signal as detected will be reduced. This will indicate that the detector has become blocked and may have reduced coverage which is helpful, provided that the build up is actually between the piezoelectric transducer and the microphone. However, if the detector is exposed to extreme environmental conditions such as heat, cold or humidity, the signal strength of the test signal at the microphone may be either increased or decreased outside of the acceptable signal parameters. In particular, the narrowband test signal produced by the piezoelectric transducer is more susceptible to environmental extremes of temperature than the broadband pressurised leak signal to be detected. As a result the test signal emitted by the piezoelectric transducer may fall outside the tolerance levels at point of detection, (causing fault alarms) even though the detector is still functioning well within the parameters of installation. Operator confidence can be lost as a result which is undesirable. If the tolerances for the acceptable signal source are relaxed to address this problem it is possible for the receiver transducer to drift outside of acceptable calibration points.

A further problem with this first type of self-test is that mounting the test transducer on the outside of the enclosure results in a blind spot since it must protrude into the sensor's cone of sensitivity.

A second type of self-test that is more recent utilises the naturally occurring background noise to monitor the detector functionality. In particular, the background noise is used to check whether or not the receiver transducer of the detector is still operational; if the background noise is not detected the detector generates a fault alarm. The problems with this are that the receiver transducer has to have a very low sensing threshold (otherwise the self-test will not work in quiet environments), and there is no alternative way for the operator to check functionality.

In summary, existing ultrasonic gas detectors have reliability problems as far as self-testing is concerned.

Another problem facing ultrasonic gas leak detectors is variation of air temperature and humidity between the source of the gas leak and the detector. These fluctuations cause variation in the amplitude of the ultrasonic sound at the detector; in particular decreasing amplitude with increasing temperature. Therefore it is important to check that such environmental changes have not caused the detector to become 'deaf' to gas leaks at the current alarm threshold. For example, it is possible that a gas leak which would have just triggered an alarm may fail to do so if the temperature has increased at the plant so that the sound pressure level at the detector now falls below the alarm threshold. To overcome this problem it is known either for the detector to monitor external temperature and humidity and adjust the alarm level accordingly, or to perform regular manual calibration of the detector. The latter option is more common as this does not require additional circuitry within the detector. However, this strategy does require that detectors are either returned to the factory or calibrated in situ. Both options are time consuming as the detectors are usually mounted several metres above ground level in order to achieve maximum sensing distances. The return-to-factory method involves replicating on-site conditions such as distance, temperature, humidity and mimicking a gas leak in order to investigate detector sensitivity at various points across the detection frequency range. The on-site method uses a handheld device that comprises a narrowband signal source. The device is placed over the sensor to seal it from the environment and which places the narrowband signal source at a known distance from the sensor. By re-tuning the narrowband source to emit at different centre frequencies the broadband frequency range of interest can be investigated. One problem with both of these methods is that site personnel are required to access the detectors, and on-site calibration can only be carried out during routine maintenance schedule.

It would be beneficial in at least some embodiments of detector to have a calibration system that can recreate factory conditions and check points across the frequency range without the need to access the detector whilst it is in use on site.

Existing forms of fixed ultrasonic gas leak detector utilise a single sensing head due either to the cost of the sensor or the circuitry involved to achieve the necessary certification for use in hazardous areas. Since there is no direct interaction between leaking gas and the detector it is currently not possible to determine which type of gas is leaking. Furthermore due to the small amount of energy and the wavelengths within the sensing range, together with the nature of sound propagation through air, it is extremely difficult to ascertain the direction of the leak source using current detector design.

The amplitude of airborne sound at a given frequency at the sensor is dependant upon inter alia leak size, pressure, gas type, gas temperature and most importantly distance between leak source and sensor. Presently installation of fixed ultrasonic detectors usually provides a large coverage area which may contain multiple leak points from different pressure processes. One of the current strategies in an alarm situation is to shut down all processes within the coverage area. This is clearly costly for the plant operator and may not be necessary if the location of the leak and the associated process could be identified more accurately.

It would be beneficial in at least some embodiments of detector to provide an indication of a gas leak direction with respect to one or more detector.

Installation of gas leak detectors gives rise to further problems. In particular the current method involves mapping the background ultrasonic noise within the detector frequency range in installation area. The alarm level of detector is then manually adjusted to suit the on-site conditions. In particular, the alarm level is often set at approximately 6 dB higher than the background. One problem with this method is that the higher the background noise level, the smaller the detection range of the detector. This is due to the fact that a pressurised gas release will generate a sound pressure level which decreases at approximately 6 dB every time the distance from the source is doubled. For example, if a leak produces 102 dB at a distance of 1 m the sound pressure level will be 96 dB at 2 m, 90 dB at 4 m etc. As alarm level is usually set at 6 dB above background then the alarm level setting for an 84 dB background would be 90 dB. This will give a detection radius of 4 m for the leak example given. If background level is 90 dB current philosophy dictates that the detection radius will be 2 m. If the detection radius is too small other forms of gas detection are usually used instead, such as infra-red point detectors for their ability to identify the gas detected.

A further problem has been identified with this methodology: the background noise environment is dynamic. Therefore maximum safety alarm levels should be reviewed regularly to ensure that the sensing distance of the detector has not deteriorated.

Most ultrasonic background noise is characterised as a spike of narrowband noise (typically 1 to 2 kHz) somewhere within the detector sensing range. Such spikes are often caused by faulty mechanical components in machinery or attenuation from audible alarm devices. Due to the nature of the mechanical noise it is possible for the spikes to change frequency as the wear continues resulting in frequency drift up or down from the initial spike frequency. Such spikes can result in false alarms using existing detector functionality. The current installation method usually deals with such spikes either by reducing the detection radius of the ultrasonic detector or by selecting another detection method.

It would therefore be beneficial to provide a detector that is able to be used in areas containing electronic transducers and/or mechanical equipment and which does not trigger false alarms from ultrasonic signals emitted from the transducers and/or equipment.

To the best of the applicant's knowledge and belief all currently available sensors for detection of airborne ultrasound are of two main types: microphone and piezoelectric; each uses a different method to measure the sound pressure level.

Microphones typically use a diaphragm which moves within an electro-magnetic field or acts as one plate of a capacitor, which in turn, creates a variance in an electrical current. The electrical current can then be processed to determine the frequency and sound pressure level present at the diaphragm.

Due to the nature of construction of microphones the electro-magnetic field or area between the capacitance plates needs to be kept free from moisture and other contaminants to maintain accurate signal tolerances. When used in harsh industrial environments (e.g. on an oil drilling rig) the sensing face must be shielded from the ingress of moisture and contaminants which means they can only be mounted facing downwards which severely restricts the sensing range. A further disadvantage arises due to the use of different materials in the diaphragm and the components of the electro-magnetic field or components in the capacitor assembly and air gap. At extreme temperatures the expansion and contraction rates of said different materials results in signal drift. Microphone construction is also extremely complicated as the tolerances of the assembly need to be carefully controlled and construction must take place in a clean environment so that moisture and contaminants are eliminated during assembly, this leads to very expensive assembly costs.

Piezoelectric sensors have the ability to produce an electrical potential which is proportional to the application of mechanical pressure. Such sensors have been used in detectors, and an example of a detector of airborne ultrasound employing a piezoelectric sensor is sold by Groveley Detection Limited under the product code GDU-01. This detector comprises a piezoelectric sensor on which is mounted a damping block, or matching material as it is often known. The purpose of the damping block is to damp the natural resonance frequency of the piezoelectric so that it has a wider frequency bandwidth of sensitivity; to that end the damping block comprises a material having an acoustic impedance which is close to or that matches that of the piezoelectric.

Detectors of airborne ultrasound are often required to remain operable over a wide range of temperatures so that they can be used in harsh environments, for example on oil rigs. The GDU-01 operates satisfactorily over a temperature range of about −25° C. to +65° C. It is still workable just outside this range, although the piezoelectric crystal begins to suffer a temperature induced drift. Oil rigs are now becoming operational in places where the temperature regularly falls below or above the aforementioned range and there is a demand in the industry for detectors of airborne ultrasound which can operate reliably over a wider range of temperatures, for example between about −55° C. and +85° C.

We have identified the problem that causes the temperature induced drift: the piezoelectric crystal and the damping block each have a different coefficient of thermal expansion. At the aforementioned extremes of temperature, the relative contraction or expansion of each part has an undesired effect on the frequency response of the detector. Due to the relatively small signal (typically mV) produced by the piezoelectric crystal, the damping block must be carefully mounted to the crystal to avoid losses and therefore reduction in output. Current mounting methods include bonding and application of a viscous membrane under clamping pressure. Therefore we have recognised that whilst a piezoelectric crystal is extremely reliable in harsh environments because it is unaffected by moisture and other contaminants, it can suffer from drift at extreme temperatures due to the expansion and contraction differentials of the piezoelectric material and damping block material.

It would be beneficial in at least some embodiments to provide a detector that offers less temperature-induced drift and/or increased linearity across its detection range over a wider range of temperature, for example between about −55° C. and +85° C. The detection range may be between about 25 kHz and 80 kHz, and between about 58 dB to 106 dB.

SUMMARY

According to some embodiments of the present invention there is provided an ultrasonic detector suitable for mounting in a position for surveying an area for a source of airborne ultrasound, which detector comprises a sensor for detecting an ultrasonic sound signal, characterised by a transducer configured or adapted to produce a broadband ultrasonic sound signal for reception by said sensor enabling said ultrasonic detector to perform a self-test. Preferably the self-test is performed by the detector whilst it is mounted in position. In some embodiments the self-test is a periodic forced test and in other embodiments the self-test is a periodic calibration check. In other embodiments, the detector is configured to perform both periodic forced tests and periodic calibration checks. By generating a broadband sound signal, the proper functioning of the detector can be checked over its entire frequency range, or a smaller part of it if preferred. Furthermore a broadband sound signal has a frequency spectrum that more closely resembles a real gas leak and is therefore a more reliable way to test the correct functioning of the detector. An additional advantage is obtained if the transducer is placed inside a housing of the detector: the transducer and the signal it produces during use are both shielded from the environment external to the detector. In this way changes in temperature and humidity in the external environment have a limited effect on the operation of the transducer and on the broadband ultrasonic sound signal, whereby the accuracy of the self-test is greatly improved.

The source of airborne ultrasound may be a gas leak remote from said detector.

The detector is preferably of the non-hand held variety and is intended to be mounted in a fixed location at an industrial plant. The detector may be moved from that fixed location for maintenance or other purposes. In some embodiments the detector is designed for use in explosion endangered environments. The detector has a frequency range over which it is most sensitive; this frequency range may comprise a lower part of the ultrasonic frequency range, for example from about the upper threshold of human hearing up to about 80 kHz. A frequency range of 25 kHz to 80 kHz has been found to work well, although other narrower or wider frequency ranges are possible.

In some embodiments the detector is configured to detect a source of airborne ultrasound that comprises a gas leak e.g. a high-pressure gas leak from process equipment in an industrial plant. The detector may also be suitable for detecting airborne ultrasound emitted by worn stressed or mechanical parts.

In some embodiments the source of airborne ultrasound produces a spectrum having a broadband characteristic with no one frequency that is dominant. The broadband spectrum usually spans most of the detector frequency range.

In certain embodiments the sensor may be any sensor that comprises at least two oppositely opposed sensing faces. For example the sensor may comprise a piezoelectric transducer and may be a lead zirconium titanate (PZT) transducer. The shape of such a piezoelectric transducer may be generally cylindrical (e.g. circular or elliptical), or a hexahedron such as a cube, cuboid, prism or rhombohedron. A cuboid shape has been found to work well.

The sensor may comprise the transducer part of a microphone; in that way the usually hidden side of the microphone transducer may be used to pick up the broadband ultrasonic sound signal from the transducer. A microphone transducer may be used with any polar pattern and the transducer may be placed within the detector to work with that polar pattern.

The transducer of the detector may be any transducer capable of producing a broadband ultrasonic sound signal within (but not necessary only within) the frequency range of the detector. There are various ways of producing such a signal that could be used in the detector which include, but are not limited to: vibrating surfaces that vibrate with harmonics or are vibrated by an input signal comprising multiple frequencies; pressurised gas releases; and gas release against or across a surface to cause that surface to vibrate. Examples of particular transducers for producing such a signal include but are not limited to: electrostatic transducers; piezoelectric film transducers; suitably shaped tubes or pipes through which pressurised gas can be passed. The tubes may be provided with a nozzle for producing the broadband ultrasonic sound signal for example.

In certain aspects, the transducer is configured to produce a broadband ultrasonic sound signal having a frequency spectrum similar to or which mimics that produced by a gas leak. The frequency spectrum may be of a similar shape but greater intensity so that it can readily be detected by the detector over background noise levels. For example the transducer may produce a signal having a total sound pressure level of 85 dB to 95 dB across the detector's frequency range.

The transducer may comprise a choke through which a gas is passable in use, wherein said choke is shaped to produce said broadband ultrasonic sound signal upon passage of said gas at sufficient pressure therethrough.

In some embodiments the transducer is mounted inside an external housing of said detector in an area behind said sensor, whereby a sensing face of said sensor is unaffected by said transducer, but correct functioning of said sensor may still be tested by said detector.

In other aspects the transducer is mounted so as to produce said broadband ultrasonic sound signal external of said detector, whereby correct functioning of said sensor may be tested. Rather than mount the transducer within the detector housing, it is possible to emit the broadband ultrasonic sound signal externally of the detector, for example either by mounting the transducer outside the housing or within the housing but piping the sound to the external environment.

The detector may be configured to check the calibration of said sensor using said transducer. A particular advantage arises for the calibration check when the transducer is mounted within the housing. In particular, since the transducer is not exposed to the external environment the tolerance level in the calibration check can be greatly reduced. This enables any problems in the detector to be identified earlier. For example manual calibration checks typically use a tolerance level of +5 dB with a 95 dB calibration signal. Provided the detector output is between 90 dB and 100 dB the detector is said to be calibrated satisfactorily. Using an internal transducer to perform the check will enable this tolerance level might be reduced to ±1 dB or lower. In certain embodiments the detector may check the sound pressure level at a number of different frequencies within the detector bandwidth and compare each level against a pre-set threshold.

In some embodiments said transducer produces a substantially flat frequency spectrum within a frequency sensing range of the detector, whereby calibration of said detector is facilitated.

The detector may be configured, in use, to process an output signal from said sensor to estimate a direction of said source of said ultrasonic sound signal. By providing an indication of direction this may enable the plant operator to consider shut down of only certain plant processes, rather than all of the processes within the detector's area of coverage. The estimate of direction may simply be on one side or the other of a mid-line through the detector. Additionally or alternatively, the estimate may provide a more accurate direction e.g. within a certain range of angles. Preferably the detector is configured to estimate the direction of a remote source of ultrasonic sound, such as a gas leak.

In some embodiments the detector comprises at least two sensors and is configured, in use, to process an output signal from each of said at least two sensors to provide said estimate of direction. Using more sensors to obtain the estimate of direction helps to improve accuracy.

In other aspects, in use, said detector or a part thereof is rotatable about an axis whereby said sensor may be rotated whilst said output signal is monitored, and said detector is configured to rotate until said signal is substantially at a maximum or other predetermined value, whereby said indication of direction is provided by the rotational position of said detector relative to a reference position. This enables an accurate estimate of direction to be obtained using only one sensor. Using two sensors the detector may rotate until the output signals from each sensor are substantially the same; the source lies approximately on the line bisecting the angle between the two sensors.

In certain aspects said detector is configured, in use, to monitor a frequency bandwidth for said ultrasonic sound signal, at least a part of which frequency bandwidth is removed or ignored so as to inhibit said detector generating a false alarm in response to an unwanted ultrasonic sound signal. This enables the detector to continue working in high background noise environments. Discovery of an unwanted part of the bandwidth having a high sound pressure level may indicate machine wear or other problem with the machinery in the plant. Accordingly the detector may be configured to alert the plant operator when such a part of the bandwidth is discovered. The unwanted sound signal may have either broadband or narrowband characteristics and the detector may be configured to remove or ignore either type of signal. How much of the spectrum is removed or ignored by the detector will depend on each site and where the detector is positioned.

In some embodiments, said detector is configured, in use, to examine said frequency bandwidth for any sound pressure levels above an alarm threshold and to remove or ignore any frequency range that is below a predetermined percentage of said frequency bandwidth, whereby said detector may operate substantially without false alarms being caused by said unwanted ultrasonic sound signal. In this way, a safety threshold is provided above which an alarm is triggered since sufficient of the bandwidth is taken up by ultrasonic noise above the background level to indicate a gas leak for example.

The detector may be configured to periodically monitor said bandwidth so that any frequency shift of said unwanted ultrasonic sound signal is detected, whereby a corresponding shift may be made of said part of said frequency band that is removed or ignored.

According to some embodiments of the present invention, there is provided a method of surveying an area for a source of airborne ultrasound, which method comprises the steps of surveying said area using an ultrasonic detector as set out above and using said transducer to emit a broadband ultrasonic sound signal whereby a self-test of said detector is effected. In some embodiments the method may further comprise the step of said detector outputting an alarm signal upon detection of a source of airborne ultrasound. The alarm signal may trigger remote alarms elsewhere on or off site in order to alert an operator.

According to some embodiments of the present invention there is provided a method of surveying an area for a source of airborne ultrasound, which method comprises the steps of installing in or adjacent said area one or more ultrasonic detector as set out above.

According to some embodiments of the present invention there is provided an ultrasonic detector suitable for mounting in a position for surveying an area for a source of airborne ultrasound, which detector comprises a sensor for detecting an ultrasonic sound signal, characterised in that said detector is configured to process an output signal from said sensor to provide an output indicating a direction of said source of said ultrasonic sound signal. If the detector is of the static type two or more sensors are required to enable an indication of direction to be determined. However, if the detector is rotatable or comprises a part holding the sensor that can be rotated, it is possible for an indication of direction to be determined using only one sensor.

Any directionality features mentioned herein may be combined with this aspect of the invention.

According to some embodiments of the present invention there is provided an ultrasonic detector suitable for mounting in a position for surveying an area for a source of airborne ultrasound, which detector comprises a sensor for detecting an ultrasonic sound signal, characterised in that said detector is configured, in use, to monitor a frequency bandwidth for said ultrasonic sound signal, at least a part of which frequency bandwidth is removed or ignored so as to inhibit said detector generating a false alarm in response to a narrowband ultrasonic sound signal.

Any of the frequency removal features described herein may be combined with this aspect of the invention.

According to a some embodiments of the present invention there is provided an ultrasonic detector suitable for mounting in a position for surveying an area for a source of airborne ultrasound, which detector comprises a sensor for detecting an ultrasonic sound signal, characterised by a transducer mounted inside a housing of said detector and configured to produce an ultrasonic sound signal for reception by said sensor enabling said ultrasonic detector to perform a self-test. The ultrasonic sound signal may be a broadband, narrowband or a single frequency for example.

According to some embodiments of the present invention there is provided a method of surveying an area for a source of airborne ultrasound, which method comprises the steps of surveying said area using an ultrasonic detector as set out above and using said transducer to emit an ultrasonic sound signal inside said detector whereby a self-test of said detector is effected. The ultrasonic sound signal may be a broadband, narrowband or single frequency for example.

According to some embodiments of the present invention there is provided an ultrasonic sensor for detecting a source of airborne ultrasound within a detection frequency range, which ultrasonic sensor is characterised by an undamped piezoelectric crystal held in a material which permits substantially uninhibited deformation of said piezoelectric crystal in response to incident ultrasound within said detection frequency range so that a voltage is generated between two faces thereof, but which material inhibits vibration of said piezoelectric crystal when subjected to vibrations outside said detection frequency range.

We have found that a sensor constructed in this way has an increased stability with temperature; in particular the range of linear response is increased to at least −55° C. to +85° C. which enables it to be used in very harsh environments such as Alaska and Siberia. This is a major benefit, yet is achieved with a simpler construction. It is believed that, theoretically, such a sensor could offer a substantially linear response between about −80° C. and +200° C., although this has not been proven in practice.

In some embodiments, said piezoelectric crystal comprises a piezoelectric material and a ratio between a density of said piezoelectric material to a density of said material is between about 1:50 and 1:60. We have found that this density ratio is especially effective at permitting the piezoelectric crystal to deform in response to ultrasonic sound waves, but insulate the piezoelectric from other sources of noise outside that frequency range, for example vibration from motors.

In certain aspects, said material comprises a foam. The foam may be open or closed cell, but the latter is preferred for some applications, for example where an ingress protection rating is required for the sensor.

In some embodiments, said material surrounds and is in contact with substantially all of the surface of said piezoelectric crystal, except for a sensing face and an area on a face opposite said sensing face to which an electrode is attached.

In certain aspects said piezoelectric crystal comprises a sensing face and a longest dimension of said sensing face is not longer than about twice the shortest wavelength in said detection frequency range. This helps to reduce destructive interference between sound waves at the sensing face.

In some embodiments said piezoelectric crystal has a length such that a resonance point of said piezoelectric crystal lies outside said detection frequency range. Preferably the resonance frequency lies above the highest frequency in the detection range, whereby the length of the piezoelectric crystal can be kept comparatively short.

In certain aspects the sensor further comprises a Faraday cage for insulating said piezoelectric crystal from electromagnetic noise.

In some embodiments said Faraday cage is surrounded by a damping material for damping external vibration of said sensor. In this way a two-stage damping mechanism is provided for vibrations outside the detection frequency range. It is envisaged that more than two stages could be useful in certain circumstances, for example where a very high level of vibration insulation is required. The damping material may or may not be same material as the material around piezoelectric crystal.

According to other aspects of the invention there is provided a detector comprising a sensor as aforesaid. The detector may be hand-held or non-hand-held.

BRIEF DESCRIPTION OF THE FIGURES

For a better understanding of the present invention reference will now be made, by way of example only, to the accompanying drawings in which;

FIGS. 8A-8D show a transducer part of the detector of FIG. 2;

DESCRIPTION OF PREFERRED EMBODIMENT(S)

Figure 1A:
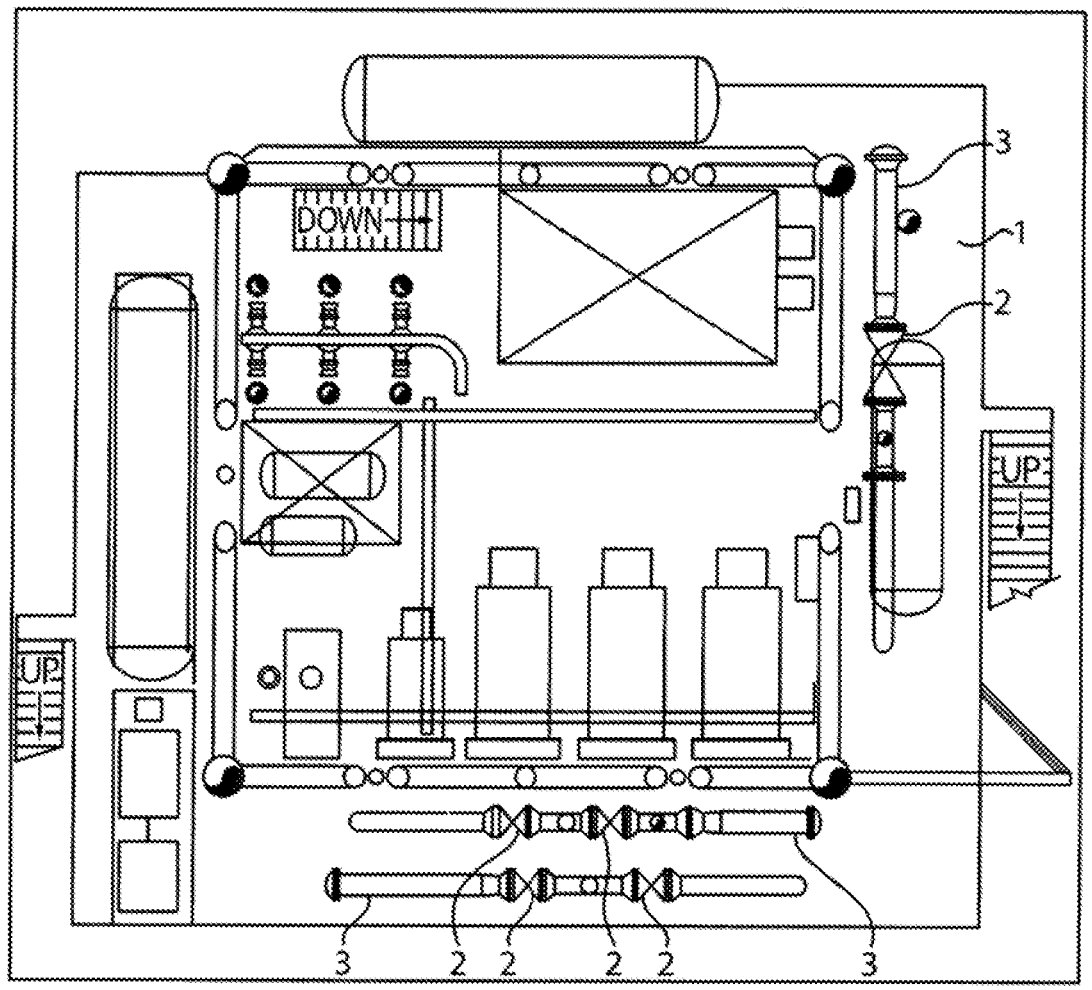
FIGS. 1A and 1B are schematic plan views of part of an industrial plant and detector positioning therein.
Figure 1B:
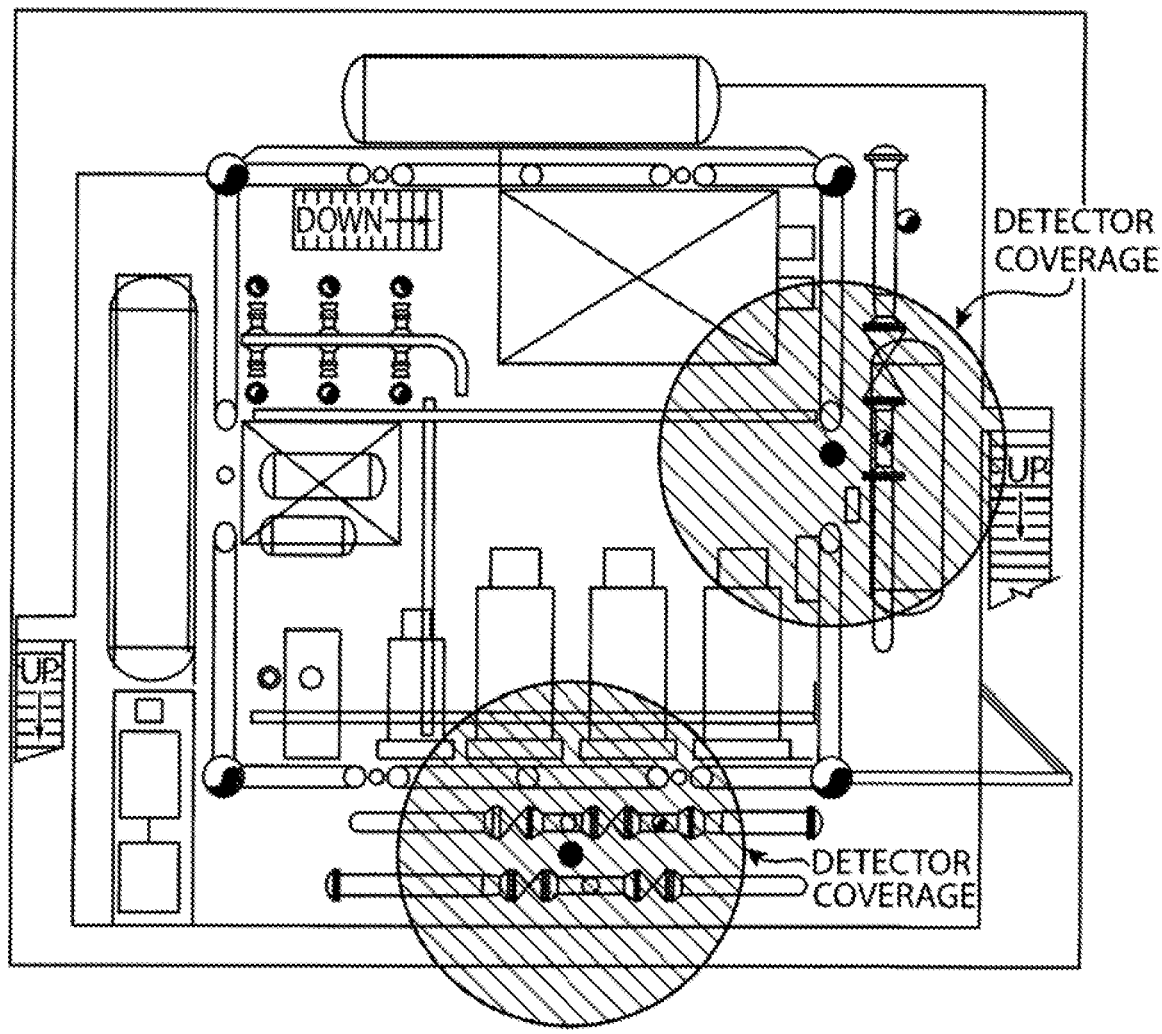

Referring to FIG. 1A a part of an industrial drilling plant generally identified by reference numeral 1 comprises multiple valve stations 2 between receiver pipe racks 3 and underground drilling heads (not shown). The valve stations 2 regulate input from the drilling heads (not shown) to the next process deck via pipe racks 3. As such the plant provides a pressure regulation function for gas (e.g. natural gas) between drilling heads and the process facility on the plant. It is important to monitor the valves and pipes for any leaks; such leaks could be a potential explosion hazard. FIG. 1B shows where two detectors have been mounted in the plant and their respective areas of coverage in which a gas leak can be detected. Any gas leaks that occur within the shaded areas in FIG. 1B can be detected and the appropriate alarms raised by the detectors.

Figure 2:
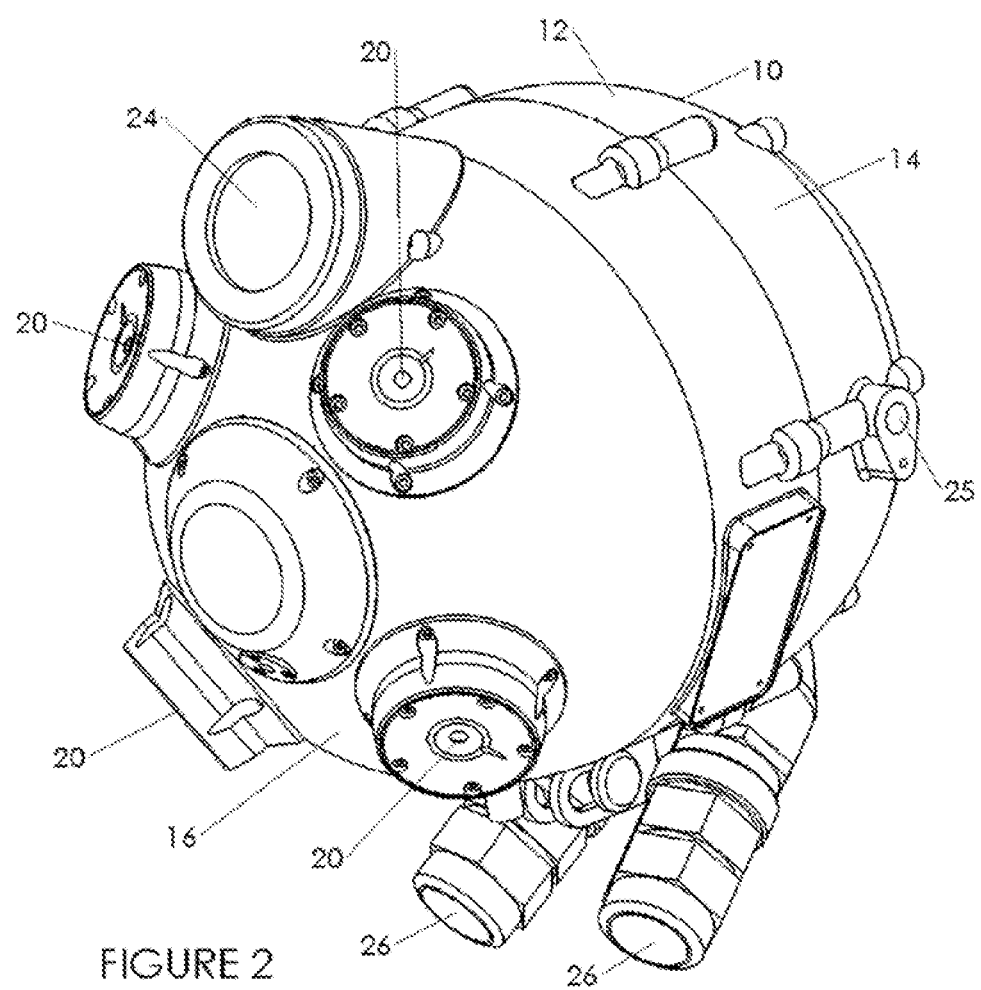
FIG. 2 is a schematic perspective view of a gas leak detector according to the present invention.
Figure 3:
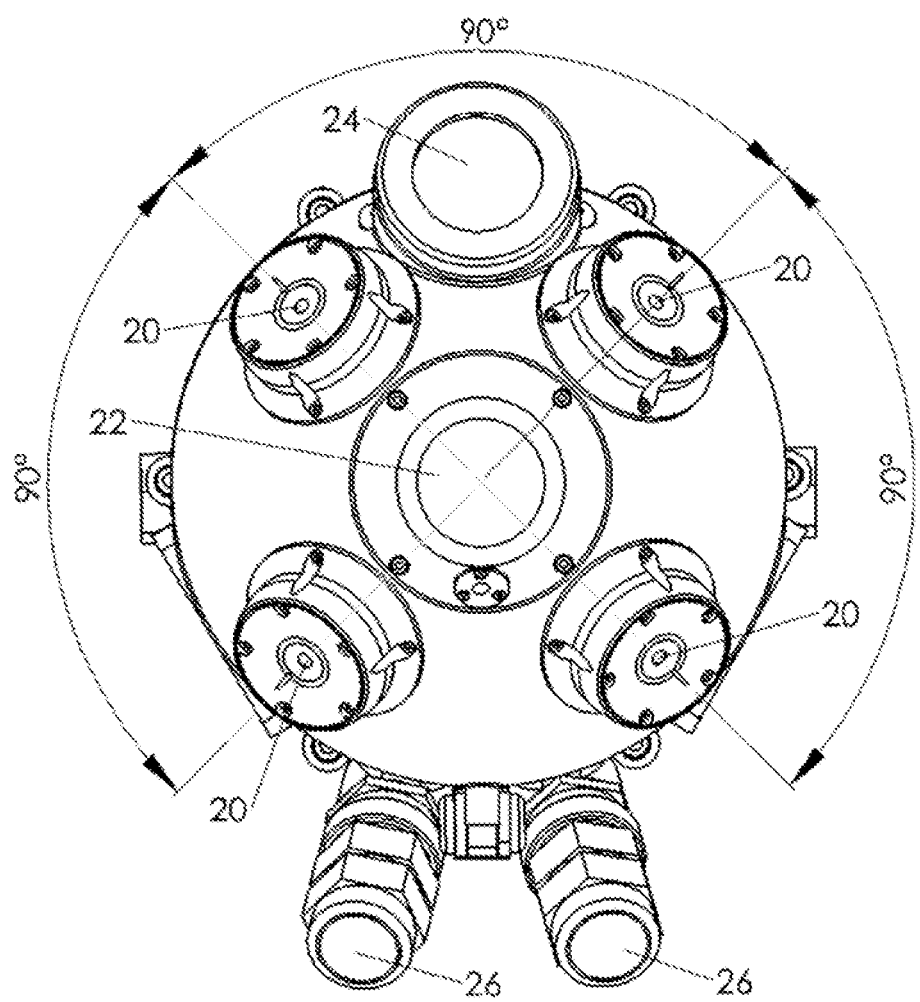
FIG. 3 is a schematic bottom plan view of the gas leak detector of FIG. 2.
Figure 4:
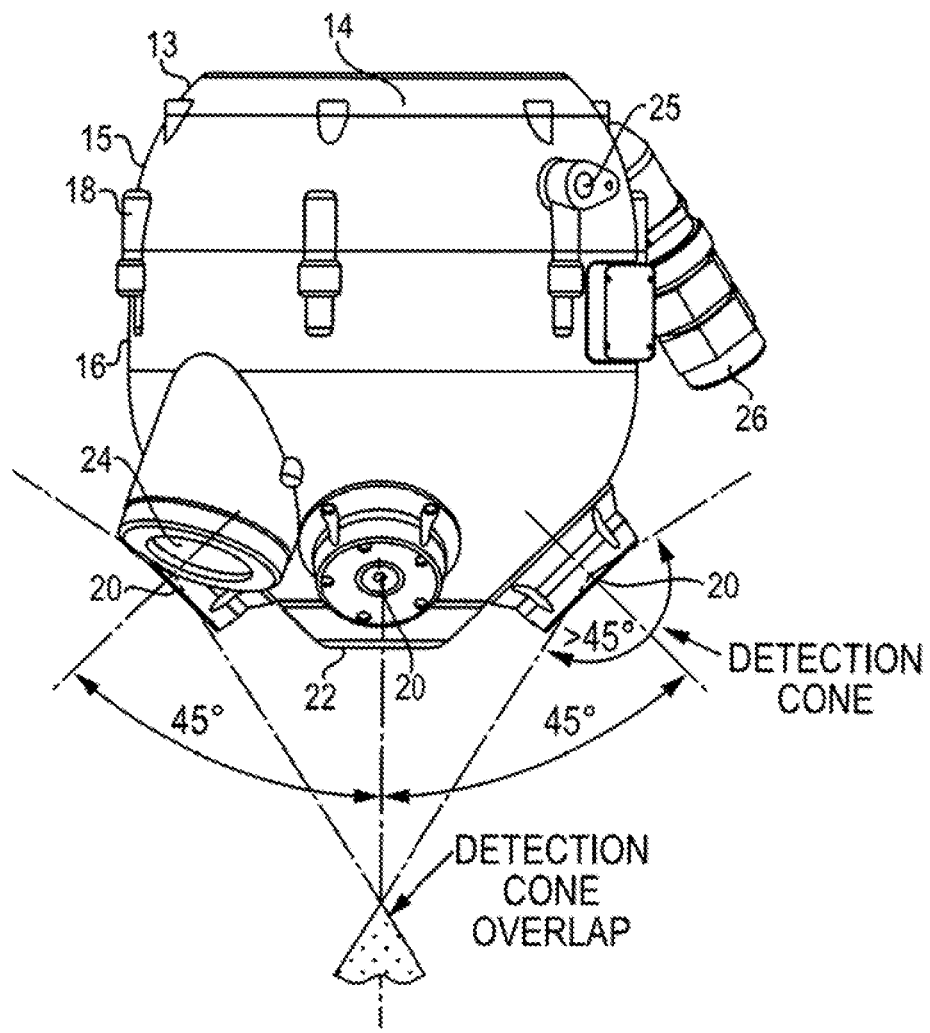
FIG. 4 is a schematic side view of the gas leak detector of FIG. 2.

Referring to FIGS. 2, 3 and 4 an ultrasonic gas leak detector generally identified by reference numeral 10 comprises a housing 12 that is usually fabricated from Aluminium LM 25 (or equivalent) or stainless steel 316 (or equivalent). The detector 10 has overall dimensions of about 247 mm high by 210 mm in diameter, and weighs about 4.5 kg if the housing is made from aluminium or about 12.5 kg if the housing is made from stainless steel. As such the detector 10 is a non-hand-held device that is intended to be positioned at a site in a fixed location by mounting on a pole or on a wall or other surface for example.

As seen more clearly in FIG. 4, the housing 12 comprises a terminal cover 13, and an electronics enclosure 14 that comprises an upper half 15 and a lower half 16 that are held together by circumferentially positioned bolts 18. The two halves 15 and 16 define an internal space with the detector 10 in which electronics, sensors, pump and other equipment may be housed as described below. The detector 10 is designed to be suitable for use in explosion endangered environments; as such the housing 12 meets the appropriate safety standard (e.g. ATEX, CENELEC) such as CENELEC EEx and all components are mounted within the detector 10 to maintain Ingress Protection (IP) and Hazardous Area Protection. However, it is not essential to the invention that the housing be of this type; the principles of the invention can be applied to detectors for use in non-hazardous environments.

Disposed around the external surface of the lower half 16 of the housing 12 are four identical sensors 20. The construction of each sensor 20 may be as described below in this embodiment or as described in the embodiment of FIG. 28. Referring to FIGS. 3 and 4 each sensor is positioned at 90° centres around the circumference of the sensor housing 16 and at 45° from the longitudinal axis of the detector 10. A removable cover 22 located centrally at the lower extremity of the detector 10 provides access to a pump as described in greater detail below. A diagnostic display screen 24 is positioned on the lower half 16 between two of the sensors 20 for maintenance purposes. Cable entry glands 26 provide access for power and data cables to the inside of the housing 12. A mounting post 25 permits the detector 10 to be mounted in a fixed position on site.

Figure 5:
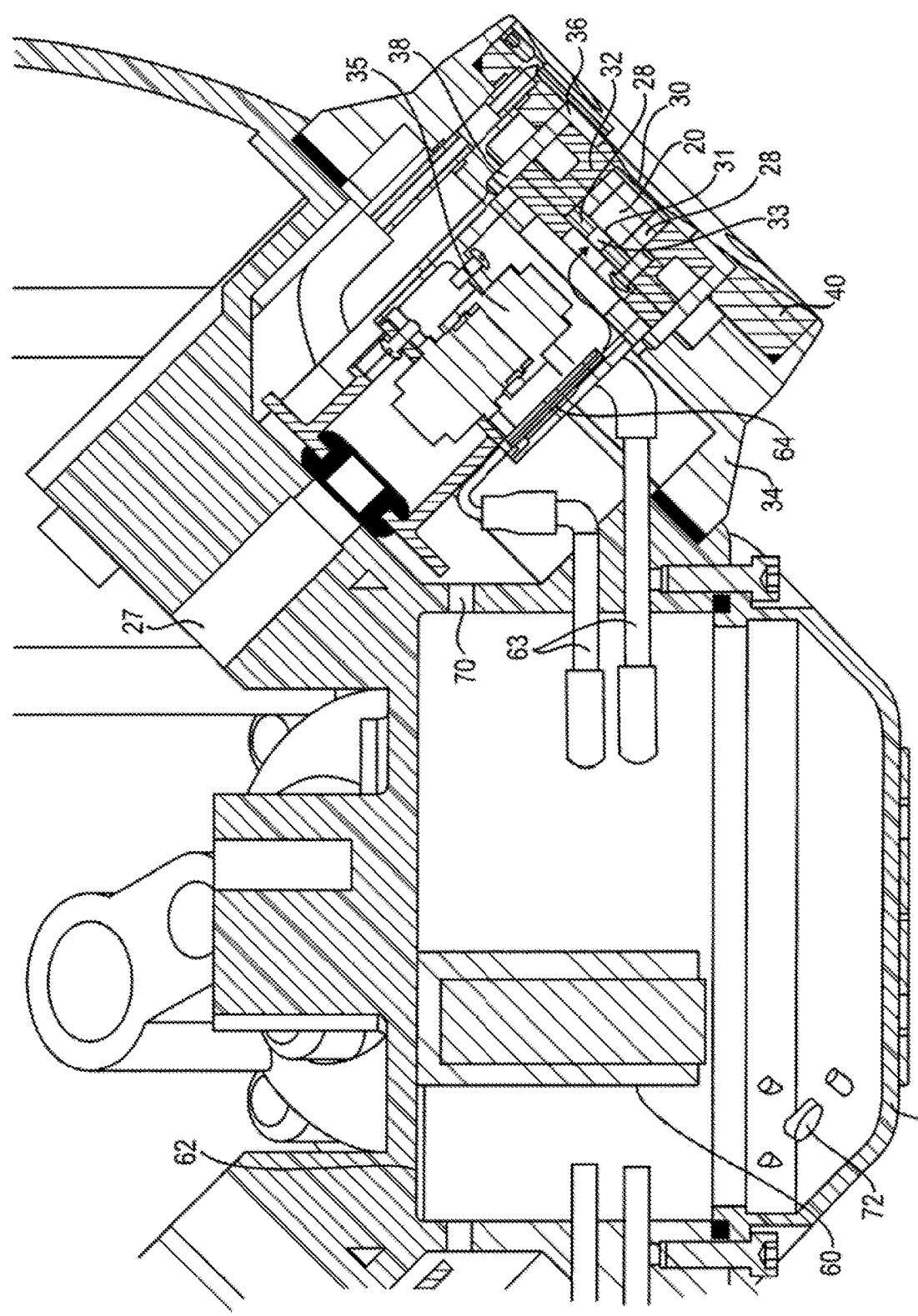
FIG. 5 is schematic side cross section view of part of the gas leak detector of FIG. 2.
Figure 6:
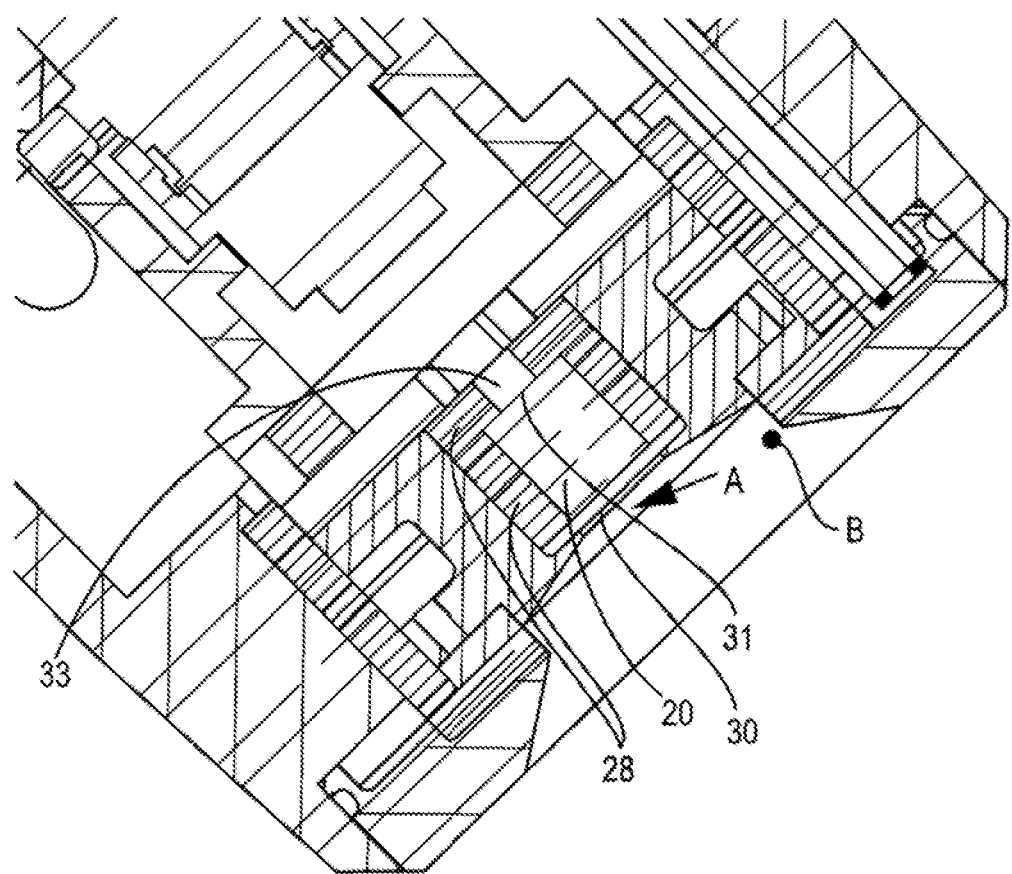
FIG. 6 is an enlarged view of a sensor part of the detector shown in FIG. 5.

Referring to FIGS. 5 and 6 the sensor 20 comprises a PZT piezoelectric cylinder of 5 mm diameter and 242 kHz+/−3% frequency thickness; the sensor has fired on silver electrodes (not shown), one on each of the two flat faces of the cylinder. A particular sensor of this size that has been found to work is sold by Electro Ceramics Ltd and is sold under part no. 9022/02011/026 and is made from the material known as PZT5A1 (a form of lead zirconium titanate). To meet hazardous certification the sensor 20 should be the only electrical part of the sensor arrangement outside the housing 12. Electrical communications for each sensor 20 pass through a respective sealed passage 27.

Other piezoelectric transducers having different shapes and/or materials would be suitable (see in particular the description of alternatives provided in respect of the sensor 110 below). Selection of a suitable piezoelectric transducer begins by determining the desired frequency range for the detector 10. Typically this will be a range within the lower end of the ultrasonic frequency band, such as 25 kHz to 80 kHz, although smaller and larger ranges are possible. Noise from a gas leak typically spans such a frequency range, and other problems that the detector may look for (such as worn bearings) can be found within this range. Once detector frequency range has been established it is recommended that the piezoelectric transducer is selected with a natural frequency outside of this range; for example if the desired detector range is 25 kHz to 80 kHz, the natural frequency should be greater than 80 kHz. The aim of this is to place the frequency range of interest in a roughly flat part of the frequency response curve of the piezo. If the natural frequency of the piezoelectric transducer cannot be placed outside the detector frequency range, the piezo may still be useful although the response may be damped; this is not recommended.

A suitable size for the transducer can be determined as follows. The diameter should ideally be less than the smallest wavelength in the frequency range or at least smaller than the centre band wavelength in order to avoid excessive directional and lobe effects. However, the sensor should ideally be as large as possible to increase signal response with respect to the parameters mentioned. In this example the wavelength would be 345/80000=4 mm at 80 kHz and 8 mm at 40 kHz; therefore the diameter should be selected to be approximately 4 mm or larger, although less than 8 mm. This strategy will help to eliminate nulls and lobes at certain angles. The length of the transducer should then be as close as possible to the diameter size; so in this case a piezo may be selected having a 6 mm diameter and a 6 mm length. It is not recommended to make the length to diameter ratio more than 2:1 to avoid low frequency vibration modes.

Whilst it is preferred to use piezoelectric transducers, any other transducer that can sense sound pressure on two opposite sensing faces could be employed instead. For example, current off-the-shelf microphones do not meet this requirement but could be adapted to meet it.

To enable the sensor 20 to operate effectively it must be protected from external vibration and internal noise. To that end the piezoelectric cylinder is enclosed in vibration reducing material 28, such as cross-linked polyethylene foam; this material may also be watertight to assist environmental rating. All sides of the piezoelectric cylinder are covered by the material 28 with the exception of an outwardly facing sensing surface 30 and part of the opposing face 31. In particular, the material 28 adjacent the face 31 comprises a passageway 33 that permits ultrasound to reach the face 31 via an air path from a source inside the detector 10 as described in greater detail below. To reduce electrical interference the sensor 20 and material 28 are mounted in a Faraday cage structure 32 made from steel or an electrically conductive material that also surrounds all sides of the sensor except the sensing face 30. The Faraday cage structure 32 and its contents form a sensor assembly that is mounted in a sensor housing 34 via a connector 35. The sensor assembly is electrically insulated from the sensor housing by material 36, 38 (cross-linked polyethylene foam). A sensor cover top 40 (made of the same material as the housing 12) retains the sensor assembly and material 36, 38 in the sensor housing 34. The sensor cover top 40 is sealed to the Faraday cage structure 32 by an environmental seal 42. The seal 42 covers the exposed face of the sensor 20 to protect it from the environment. The seal may comprise a flexible hard setting rubber compound that, before setting, is flowable with low viscosity to allow shallow section potting and that will adhere to the sensing face 30 of the piezoelectric disc. The compound should also be an electrical insulator, resistant to UV, and the temperatures and chemicals that it will be exposed to on site. The flowable nature of such a compound before setting helps to reduce air pockets between the seal and the sensing face 30. A suitable type of compound is a room temperature vulcanising silicone rubber; one example that has been found useful is FLOWSIL FC sold by Intek Adhesives Ltd. The compound should be applied using a fill line to form a layer of between about 0.5 mm and 1 mm thick over the sensing face 30, although other thicknesses are possible. In this way the area inside the sensor cover top 40 is sealed from the environment to allow heating or cooling within the sensor housing 34 as described in greater detail below.

The seal 42 affects the frequency response characteristics of the piezoelectric transducer, although it has been found that using a compound as described above with a specific gravity of between 1 and 1.5 g/ml causes negligible performance loss. To check the response characteristics the sensor 20 is calibrated during manufacture using a known sound source at a known distance from the sensor 20 at five points across the frequency range of the detector 10. The zero and gain are then trimmed to within set limits.

A signal cable (not shown) passes through the sealed passage 27 and is electrically connected to the two electrodes of the sensor 20. The other end of the cable is connected to a pre-amplifier inside the housing 12. The signal cable should be kept as short as possible to reduce electrical interference.

If the detector 10 used at a site exposed to the environment and in a relatively cold climate liquid may build up on the sensing face 30 and may freeze. This is undesirable as it will change the response characteristics of the sensor 20. To inhibit such freezing the sensor cover top 40 and sensor housing 34 may be heated via conduction and/or convection by a heating rod to maintain the sensing face 30 above freezing point.

Figure 7:
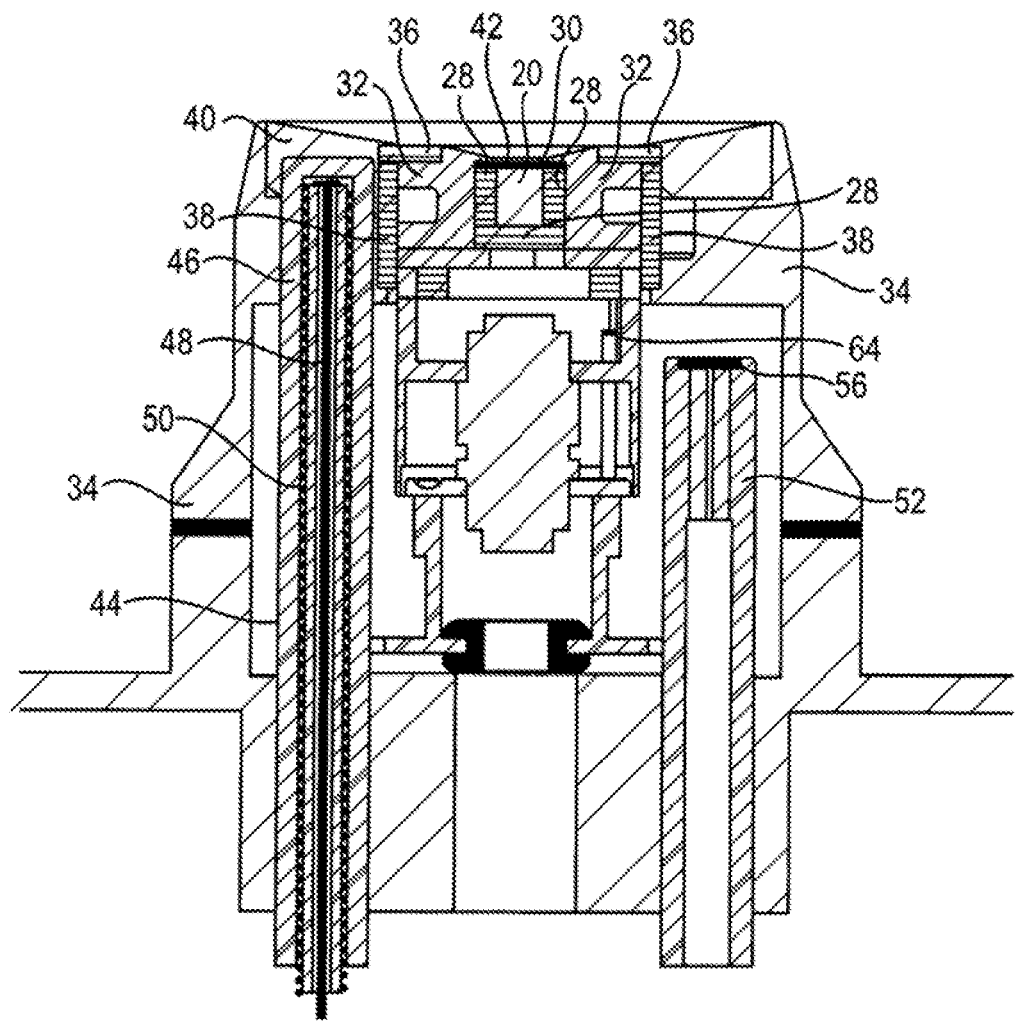
FIG. 7 is a schematic side cross section view of a sensor part of the detector showing a heating mechanism.

Referring to FIG. 7 a heating rod 44 extends into and through the interior of the sensor housing 34, with its far end in contact with the sensor cover top 40. The heating rod 44 comprises a cylindrical rod 46 having blind bore therethrough; the rod 46 comprises the same material as the housing 12. The open end of the rod 46 is connected to the housing 12 and is communication with the interior thereof. In this way the integrated of the housing 12 is maintained. A core 48 comprises a hollow cylinder around which a heating tape 50 is wound. At the extremity of the rod 46 the free end of the wire in the heating tape 50 passes through the hollow interior for electrical connection within the interior of the housing 12. A temperature sensor 52 comprises a hollow cylindrical rod 54, one end of which is located within the interior of the sensor housing 34 and the other end of which is connected to the housing 12. A temperature sensor 56 is mounted on the free end of the rod 54 for monitoring the temperature of the internal space within the sensor housing 34. Wires (not shown) pass through the interior of the rod 54 and connect the temperature sensor 56 with electronic circuits in the interior of the housing 12. Similar parts can be used to heat the pump compartment.

Referring again to FIG. 5, a diaphragm pump 60 is housed in a pump compartment 62 outside the main enclosure provided by the housing 12 in order to meet hazardous certification requirements. However, if the correct precautions are taken the pump 60 could be housed inside the housing 12. Alternatively, the pump may be replaced by an air feed if available on site. In that case the pump 60 would be replaced by a bulkhead connector and a valve for controlling flow. Access to the pump is provided by the removable cover 22.

An outlet from the pump 60 is connected via metal pipes 63 (reducing from 3 mm ID to 1.5 mm ID) to a respective nozzle 64 in each sensor housing 34. The nozzle 64 can also be seen in FIG. 7. The nozzle 64 is located within the space enclosed by the sensor housing 34 and is therefore located behind the sensing face 30 of the sensor 20. In this embodiment the centre of the nozzle 64 is positioned about 8 mm behind the sensing face 30 and about 6 mm from its centre. However, the nozzle 64 can be positioned anywhere within the space inside the sensor housing 34, providing that, in use, the sound pressure level is high enough at the opposing face 31 of the piezoelectric transducer.

Referring to FIGS. 8A, SB, 8C and 8D the nozzle 64 comprises a tube that is flattened to form a choke 65. The end of the tube is crimped to form slit 66 having a length of about 0.9 mm, a width of about 0.05 mm and a depth of about 0.3 mm. This shape of the choke 65 can be achieved by crimping or swaging for example. In use, air is forced by the pump 60 through the pipe 63 and nozzle 64. The effect of the shape of the choke 65 on the airflow (in particular, an increase in just upstream of the nozzle 64)) causes a broadband sound signal which includes a broadband component in the ultrasonic region of the spectrum. In this way a transducer is provided that, in use, generates a broadband ultrasonic sound signal.

In this embodiment a choke refers to a device that creates a choked flow condition caused by the Venturi effect. The choke forces the pressurised air from the pump 60 through a restriction into a lower pressure environment where the velocity must increase to satisfy the equation of continuity. Using the Venturi effect, when a state of choked flow is achieved the velocity approaches the speed of sound and produces ultrasonic noise.

Steady state choked flow occurs when the ratio of the absolute upstream pressure to the absolute downstream pressure is equal to or greater than:

$$\left[\frac{(k+1)}{2}\right]^{\frac{k}{k-1}}$$

where k is the specific heat ratio of the gas.

Calculations show that sonic flow or ultrasonic sound pressure level will be achieved when the ratio between upstream pressure to ambient pressure (atmosphere) is >1.89 (for air); however ultrasonic sound pressure may be achieved with a ratio as low as 1.5 upstream to downstream and will also change when other gas is present in the pressurised flow.

Using different upstream pressures and cross section areas of restriction can change the level of ultrasonic noise produced to suit the application. It is important to keep the thickness of the restriction to a minimum, the most efficient being a knife edge or sharp-edge orifice but manufacturing techniques and cost may prohibit this. Using different shapes and thicknesses of cross sections along with upstream pressures changes it is possible to change the dominant frequencies of the ultrasonic noise produced, if desired, but the output will still be predominantly broadband. In certain embodiments the choke 65 may comprise a choke plate or orifice plate which is inserted into the tube to create a restriction.

FIG. 8D shows one example of the way the choke 65 may be designed on the basis of the outer diameter 0 of the metal pipe 63. In particular the opening (in this example a round opening) of the nozzle has an internal diameter that is one half of the external diameter of the pipe 63. The length of the choke is given as one tenth of the external diameter of the pipe 63.

Figure 8E:
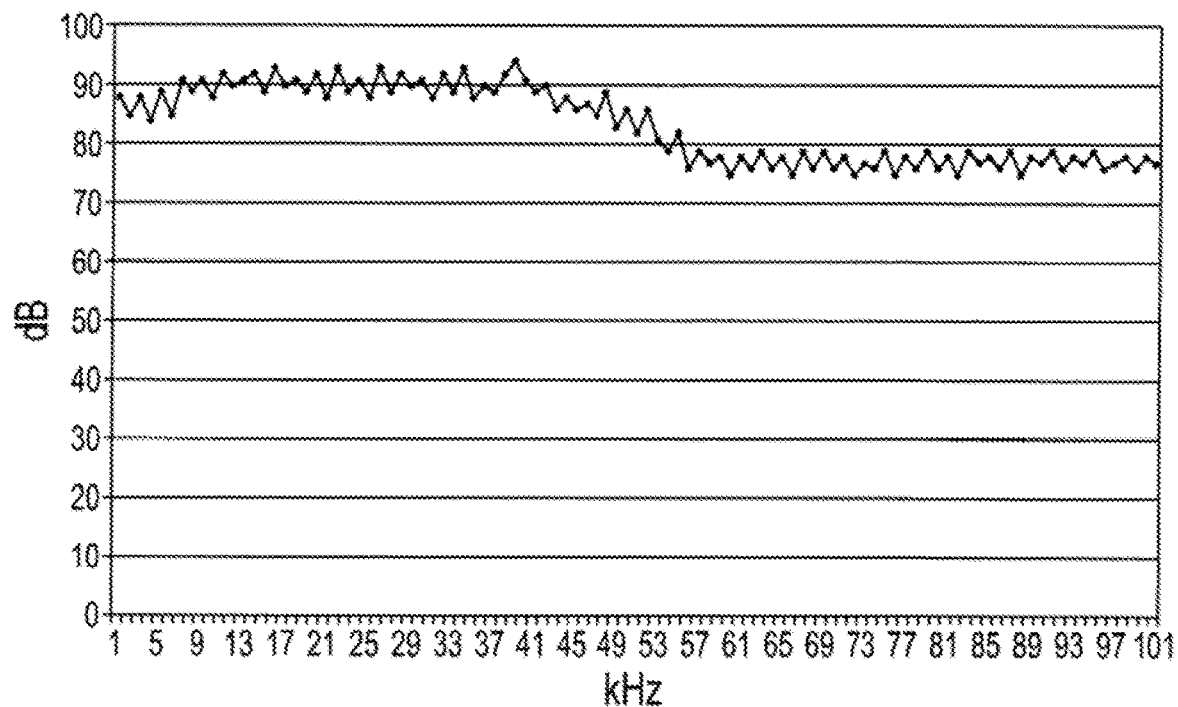
FIG. 8E is a graph of frequency versus dB of the transducer part of FIGS. 8A-8D in use.

FIG. 8E shows the frequency spectrum produced by the nozzle 64 when air at $2\times10^5$ Nm$^{-2}$ (2.0 bar) Nm$^{-2}$ is supplied to it by the pump 60. The spectrum was measured at a distance of 4 m and at an angle of 90° to the longitudinal axis of the nozzle 64. As can be seen, the spectrum has a broadband characteristic in the range of interest (e.g. 25 kHz to 80 kHz) with no single dominant frequency. It was particularly surprising how flat the frequency spectrum was. This is especially advantageous for calibration purposes as the amplification circuits do not have to be adapted to deal with frequencies of widely varying intensity across the frequency range.

To the applicant's best knowledge and belief there is no rigorous definition of a 'broadband' signal. Persons skilled in the art use the terms 'broadband' and 'narrowband' often and seem able to convey sufficient meaning by the use of these terms. Given examples of particular signals it seems that the skilled person can be place each in one category or the other without reliance on a rigorous definition. In many circumstances it will be clear to the skilled person when a signal is a broadband signal by examination of its frequency spectrum.

Following such examination, if it is not clear to the skilled person whether or not a particular signal is broadband signal, reliance may be placed on one of the following definitions:
(1) a broadband signal is any signal having a frequency spectrum that is not classed as a narrowband signal; if that is not clear then:
(2) a broadband signal is any signal having a bandwidth of frequencies greater than one third octave, where the centre frequency (f0) of the signal is used as the centre frequency of the octave. Upper (f1) and lower (f2) cut-off frequencies of one octave are given by:

$f1=f0/\sqrt{2}$ $f2=f0\sqrt{2}$ and the bandwidth of the octave is given by f2−f1. The ratio of upper to lower cut-off frequency can be expressed as:

$f2/f1=2^k$ where k=⅓ for one third octavo and k=1 for a one octave. The bandwidth of a one-third octave is then given by:

$$f1 - f2 = f0\left(\frac{\sqrt{2}}{2^k} - \frac{2^k}{\sqrt{2}}\right) \approx 0.23 f0$$

This result can be compared against the bandwidth of the signal: if the one-third octave bandwidth is smaller than the signal bandwidth, the signal may be called broadband.

As an example a signal with a 40 kHz centre frequency may be classed as narrowband as follows. For a 40 kHz centre frequency, the upper and lower cut-off frequencies for one octave are:

$f1=40000/\sqrt{2}=28.284$ kHz $f2=\sqrt{2}\times40000=56.568$ kHz

Therefore the lower cut-off for the one third octave range is:

$2^{1/3}\times28284=35.635$ kHz 5 and the upper cut-off for the one third octave range is:

$56568/2^{1/3}=44.898$ kHz

Therefore a narrowband signal with a centre frequency of 40 kHz has a bandwidth of no more than 9,263 kHz. Any signal with a wider bandwidth can be classed as broadband.

It will be appreciated that there are many other ways of producing broadband ultrasonic noise. For example the choke 65 may have a round, oval, square or other shape provided the choke presents a restriction to the air flow leaving the tube 62. The nozzle 64 can also be tuned with the exhaust part of the choke 65; in particular, the external edge of the wetted circumference of the slit 66 can be chamfered inwardly for example. A suitably shaped insert may be made from e.g. metal or plastics for insertion into the tube 62. Another choke alternative is to provide a restriction in the tube 62.

The amount of ultrasonic broadband noise can be increased by increasing the ratio of the wetted circumference of the slit 66 (in this example the circumference of the opening) to the surface area of the choke (defined as the circumference of the opening multiplied by the length of the choke—the length in this example being 0.3 mm). In one example, the pressure at the choke 65 was determined to be about $2 \times 10^5$ Nm$^{-2}$ (2.0 bar) which caused a 95 dB sound pressure level at a distance of 50 mm perpendicular from the plane of the wetted circumference 66. In practice it is recommended that a pressure of $0.35 \times 10^5$ Nm$^{-2}$ (0.35 bar) minimum is achieved at the pump 60 and at least $0.05 \times 10^5$ Nm$^{-2}$ (0.05 bar) higher than that is achieved at or just upstream of the choke 65; higher pressures are beneficial and can be adjusted to suit the particular background noise environment in which the detector 10 will be situated.

In the environments where the detector 10 is likely to be situated background 35 sound pressure level will often lie in the range 74 dB to 84 dB at the sensor 20, although higher levels are not unknown. The current regulations specify that for testing and calibration purposes the test source must achieve a sound pressure level of at least 6 dB above background at the sensor 20. Accordingly, the choke 65, pump 60 and tubing 62 should be selected and designed to provide a sound pressure level of preferably at least 80 dB and more preferably at least 90 dB at the sensor 20. Of course, if the background level is lower, the shape of the choke 65 and/or pump pressure and/or distance between the choke 65 and the sensor 20 could be adjusted to generate a lower sound pressure level at the sensor 20.

In use, the pump 60 draws air from the pump compartment 62 and pumps it into the sensor housing 34 through the choke 65. Accordingly a pressure relief path is required to ensure continued integrity of environmental seals. A port 70 is provided in the wall of the sensor housing 34 that vents into the pump compartment 62. The pump compartment 62 comprises a waterproof breathable membrane 72 that vents to the external environment. In this way, air pumped into the sensor housing can be vented to prevent pressure build-up. The pump compartment 62 is also provided with a similar heating rod and temperature sensor as that in the sensor housing 34. This permits both the space within the sensor housing 34 and the pump compartment 62 to be individually temperature controlled. Accordingly the air in the pump compartment 62 can be heated before being pumped into the sensor housing 34 to reduce the chance of sensor drift caused by warm or cool air. If the detector 10 is used in less extreme environments, the pump 60 could draw air from outside the housing 12 through an air inlet tube; this tube may be heated or cooled as required.

Instead of one nozzle associated with each sensor it would be possible to have a single nozzle nearer to die pump and to communicate the broadband ultrasonic sound signal nearer to each sensor using pipes for example.

Figure 9:
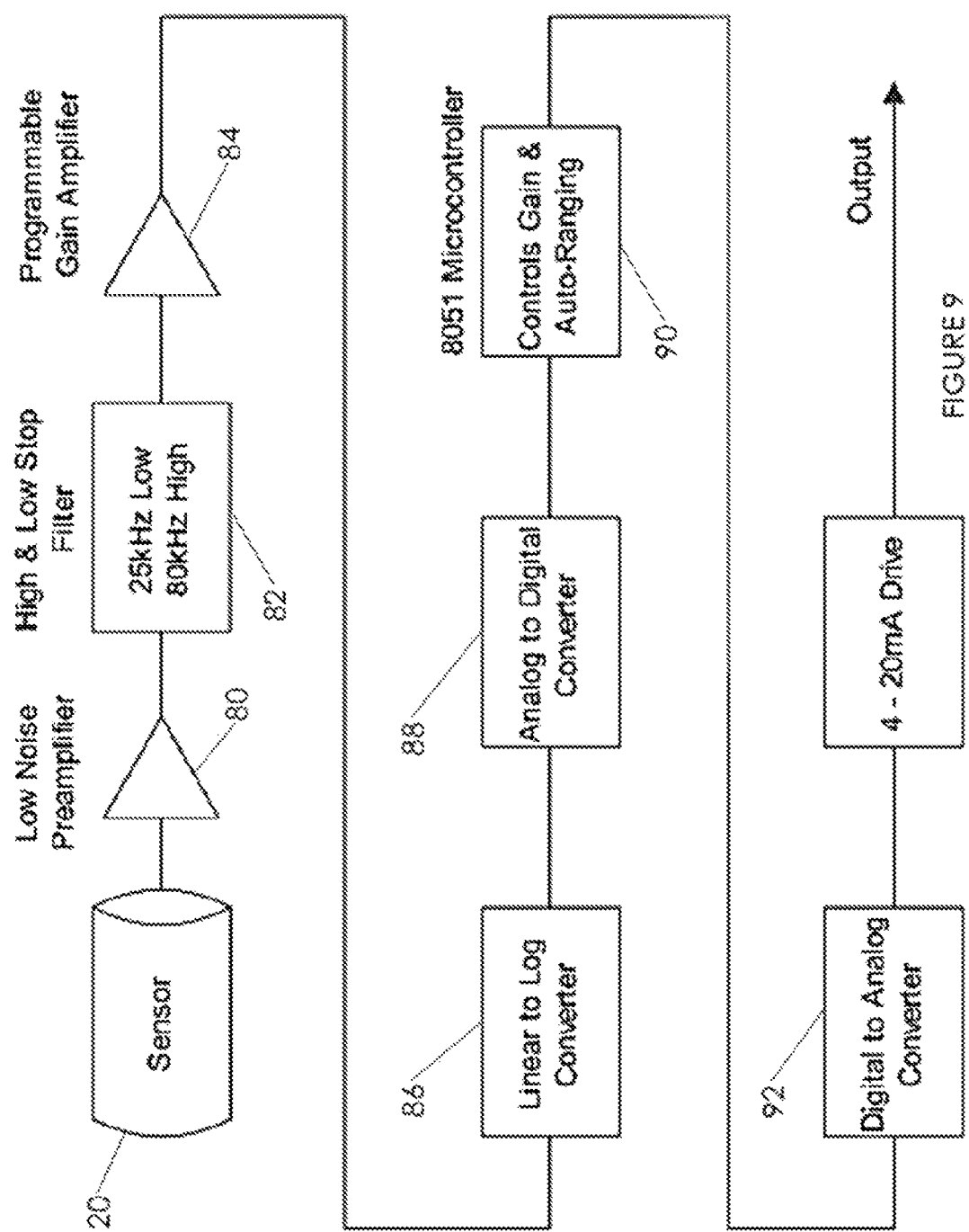
FIG. 9 is a schematic block diagram of the electronics within the detector in FIG. 2.

FIG. 9 shows the electronic circuits 78 used for receiving and processing the signal from each sensor 20. The output from each sensor 20 is typically a rapidly fluctuating signal representing sound pressure level at the sensing face 30; the signal is amplified by a low noise preamplifier circuit 80. The signal then fluctuates between about 10 μV and 1V corresponding to a sound pressure level of between 50 dB and 150 dB respectively. The signal is then passed through a combination of high and low pass filter circuits 82 and a programmable gain amplifier 84. The high pass filter removes frequencies below about 25 kHz and the low pass filter removes frequencies above about 80 kHz. This leaves a signal containing a band of frequencies in the range of interest i.e. about 25-80 kHz.

The signal is then input into a programmable gain amplifier circuit 84 is set to amplify the signal so that a 50 dB sound pressure level at the sensor 20 corresponds to a voltage level of about 0.1 mV and a 150 dB sound pressure level to a voltage level of about 100 mV. From there the signal is rectified and converted from a linear to logarithmic scale by a linear-to-log converter circuit 86. The signal is then sampled at 25 Hz by an ADC 88 and the samples input to a microcontroller 90 (such as an Intel 8051). The microcontroller 90 stores the samples in a memory (e.g. RAM, not shown) to be handled as described in greater detail below. The microcontroller 90 also controls a variable gain (or auto-ranging). In particular, if the microcontroller detects a relatively large signal near the top of its current set range it reduces the gain of the amplifier by ten times for example, and then compensates the resulting measured amplitude digitally. This is carried out as many times as is necessary to span the desired entire sound amplitude range (in this case 50 dB to 150 dB). The variable gain is increased if the sound pressure level subsequently reduces.

Following processing of the samples, the microcontroller outputs selected samples and/or results obtained from the samples to a DAC 92. The analogue signal is then used in a 4-20 mA drive that produces and output for transmission to a central control unit (not shown) elsewhere in the plant.

Monitoring and Forced Test

Under control of the microcontroller 90, the detector 10 performs a self-test on each sensor 20 at pre-determined intervals. The self-test is either carried out using the background noise level or, if this cannot be detected, by forced air blast through the nozzle 64 associated with each sensor 20. The air-blast generates a broadband ultrasonic sound signal and is repeated at regular intervals until the background noise level rises up to a detectable level again. Of course, it is possible to use only the forced test whatever the background sound pressure level (provided that the background is not 'louder' than the forced test).

Figure 10:
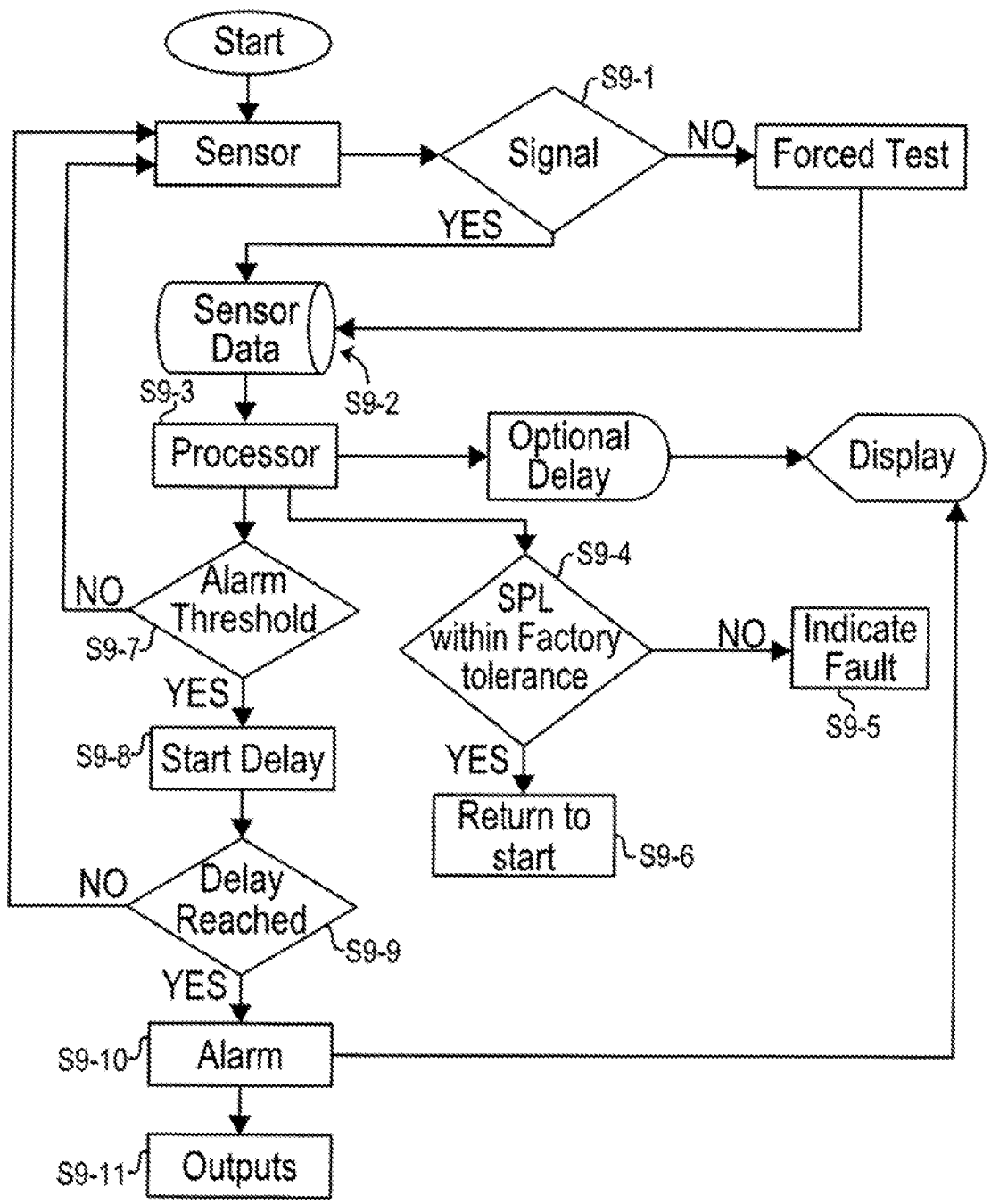
FIG. 10 is a flow diagram showing a single sensor detection method according to the present invention.

Referring to FIG. 10 a flow chart of steps in a self-test method for a single sensor 20 is illustrated. At step S9-1 the microcontroller 90 checks whether or not there is a signal from the sensor 20. This might be performed by an appropriate logic gate that indicates whether there is presently any output from the linear-to-log converter 86. If there is an output (indicating sufficient background noise level), the microcontroller 90 reads at step S9-2 the sensor data held in memory. The microcontroller 90 then determines the arithmetic average of the samples stored in memory and sends the result to the diagnostic display screen 24. An optional delay of 2-3 s may be applied to the display of the average. In this way only one average value is shown every 2-3 s which helps to reduce flutter of the displayed value and thereby improve readability.

If at step S9-1 there is no signal from the sensor 20, the microcontroller 90 firstly checks if the predetermined period (e.g. 15 minutes) has elapsed either since the last forced test, or since the background signal was not detected. If the predetermined period has elapsed the microcontroller 90 initiates a forced test in which the pump 60 is activated to force an air blast through the nozzle 64. The air blast lasts for a period sufficient to enable data from the sensor 20 be gathered and analysed by the microcontroller 90; a suitable period for the air blast is about 5 s, although longer and shorter periods are possible. To enable a force d test in high background noise conditions the test signal will need to be of a level at the sensor 20 that is greater than the background noise level. The output pressure from the pump 60 can be adjusted to suit particular background levels, although it is recommended that factory defaults be set such that +90 dB is achieved at the sensor 20. Another possibility would be for the microcontroller 90 to gradually increase pump output pressure (by controlling applied voltage) if the test signal is not registered. This might continue up to a maximum; if that test signal is not registered, then a fault would be indicated. Of course, during the emission of the test signal the detector 10 will be 'deaf' to gas leaks; it is therefore recommended that the test duration is kept to the minimum required to test correction functioning.

At step S9-3 the microcontroller 90 checks whether or not the forced test is under way. If it is, the microcontroller 90 examines the sensor data stored in memory and averages that data over a certain period (e.g. 0.5s or 1s) to obtain an average sound pressure level at the sensor 20. That average is then compared at step S9-4 against a preset threshold level that is stored in the memory of the microcontroller during manufacture (the normal alarm threshold is suspended for this sensor for the duration of the test). For example, the preset threshold might be stored as 89 dB. Accordingly it is necessary for the sensor to output a signal representing 89 dB or more during the period of the forced test. If the sensing face 30 becomes contaminated with contaminants (ice, sand, oil, etc.) the output from the sensor 30 during the forced test will decrease due to the change in vibration properties of the sensor, if the output signal is lower than the preset threshold the method is allowed to repeat to double-check the conclusion after which a fault condition is triggered at step S9-5 and the appropriate signal may be sent over the 4-20 mA interface. If the output signal exceeds the preset threshold the method returns to the start at step S9-6. This check is repeated for the duration of the forced test.

If at step S9-3 the forced test is not underway, the microcontroller 90 averages the sensor data values stored in memory to obtain a value representing the average sound pressure level at the sensor 20 over a given time period (e.g. 1s). This average value is then compared at step S9-7 against an alarm threshold level stored in memory. If the average value is not greater than the alarm threshold the method returns to the start. However, if the average value is greater than the alarm threshold, a timer is started at step S9-8 to provide a delay function, typically 15 s but could be 30 s or 60 s depending on the location of the detector. The time delay is needed to ensure that the detector 10 does not raise an alarm when routine processes take place (e.g. safety release valves) within the monitored area. If the end of the time delay is reached at step S9-9 and the average value of the sound pressure level is still above the alarm threshold, an alarm is raised at step S9-10 and the microcontroller 90 generates the appropriate outputs at step S9-11, such as activating audible and visible alarms and triggering alarms at remote locations to alert the plant operator.

Some advantages of a broadband ultrasonic sound signal include: greater reliability on the outcome of the self-test; the sensor is tested over the whole frequency range, rather than just a narrow portion per methods in the prior art; since the transducer (e.g. nozzle 64) is inside the detector housing, the self-test is less susceptible to environment changes of temperature and humidity; and the transducer does not block any part of the area of sensitivity of the sensor. Even if the broadband ultrasonic sound signal were to be emitted external to the detector, the broadband nature of the signal means that variations in temperature and humidity of the environment are less likely to affect the accuracy of the self-test.

The detector 10 may be provided with one or more sensor 20. When there is more than one sensor 20 on the detector 10, the monitoring and forced test functions are performed in a very similar way. In particular, in FIG. 9 a head selector circuit is placed between the sensors 20 and the low noise preamplifier 80. The head selector circuit is used to select an output of one of the sensors 20 for input into the low noise preamplifier circuit 80. The head selector circuit comprises an integrated analogue multiplexer circuit (such as a 74HC4051 available from NXP Semiconductors) that is used to rotate the selection of sensor output in order and in a continuous loop. For example, each sensor may be selected for a period of 40 ms during which time the method of FIG. 10 is performed on that output. Once that time has expired the next sensor output is selected, and so on. During the forced test, the microcontroller 90 uses solenoid valves (not shown in the Figures) to divert airflow from the pump 60 to the appropriate nozzle 64 adjacent the sensor to be tested. The selector head circuit continues to switch from one sensor output to the next. So whilst one sensor is subject to the forced test, the remaining three can still be used to listen for a gas leak. Once the duration of the forced test has elapsed, the microcontroller adjusts the solenoid valves to divert the airflow to the next sensor 20. In this way, all of the four sensors 20 are subjected to the forced test.

Figure 11:
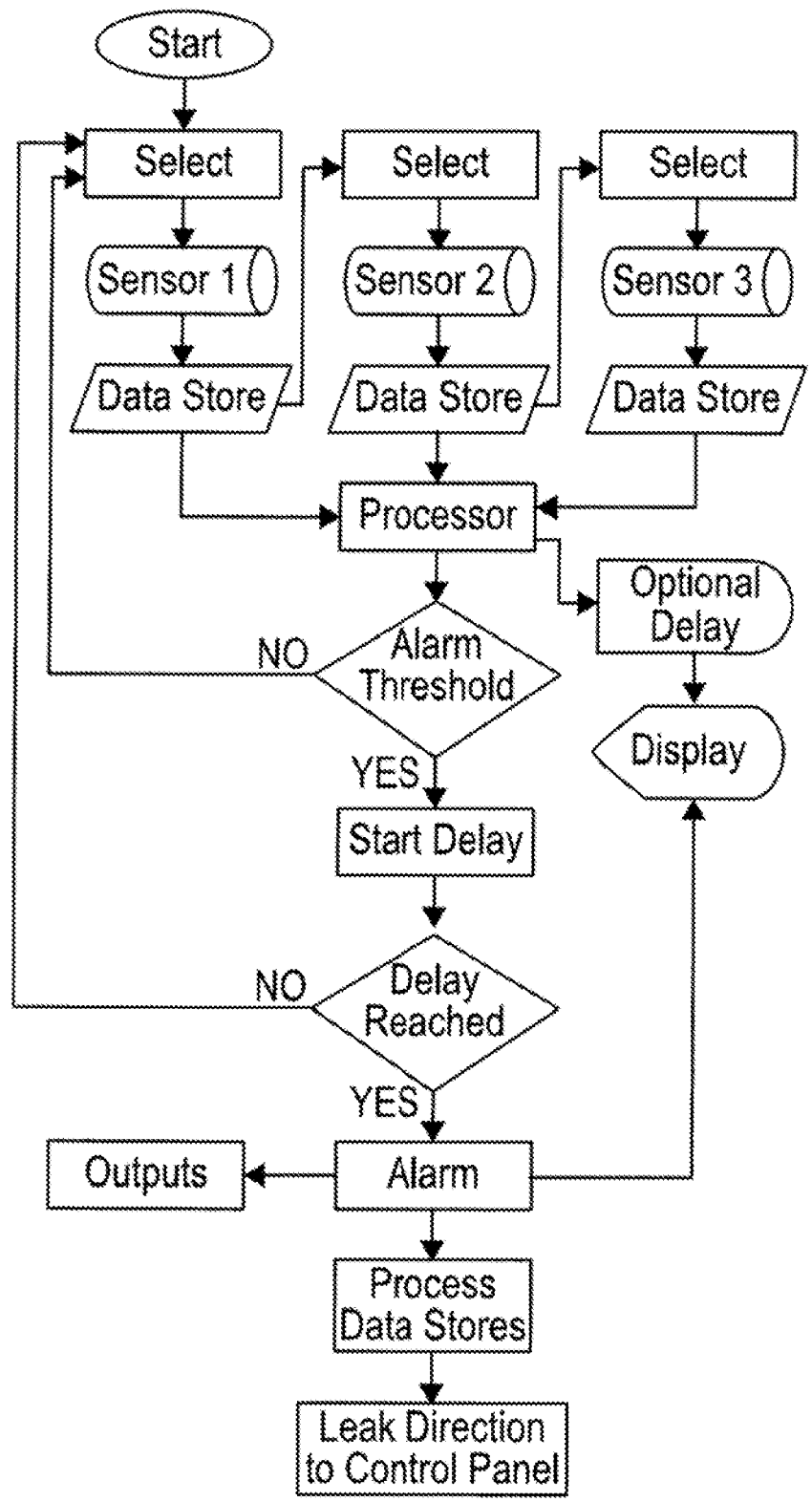
FIG. 11 is a flow diagram showing a multi-sensor detection method according to the present invention.

A suitable flow diagram illustrating monitoring and forced test for a multi-head detector is shown in FIG. 11.

Calibration

One particular problem with ultrasonic gas leak detectors is maintaining the factory calibration settings so that for example a sound pressure level of 90 dB at 50 kHz at the sensor produces an output of 90 dB+/−1 dB at 50 kHz from the microcontroller. Accordingly the microcontroller 90 is programmed to initiate a periodic calibration check of each sensor and the electronic circuitry 78. This may take place every few weeks or months as desired, and may be determined on-site during set up.

During manufacture of the detector 10, each sensor is calibrated using an ultrasonic sound source of known frequency and known sound pressure level at a certain distance. The sensor is placed at that distance and the sound source activated. The output from the electronic circuitry 78 is then adjusted so that the output from the microcontroller 90 matches the expected dB level at that frequency. The process is then repeated for different frequencies in the bandwidth. As many frequencies as is deemed necessary can be calibrated in this way, although a minimum of three spread across the bandwidth is recommended e.g. 25 kHz, 52 kHz and 80 kHz.

The calibration levels are then set and stored in the microcontroller 90. This is achieved using the pump 60 to force air through each nozzle 64 at a known pressure level (e.g. $2 \times 10^5$ Pa i.e. 2 bar). The signal from the associated sensor 20 is the processed and the output sound level in dB at various frequencies is stored in the memory of the microcontroller 90. It is recommended that the sound pressure level at each frequency be 90 dB and preferably at least 95 dB. This ensures that the calibration test can be performed in all but the noisiest of environments. It is to be noted that it is not important the output from the sensor represents an exact dB level. Due to slight variations in the shape of each nozzle 64, the recorded dB level is likely to be different for each, even though the same air pressure is supplied from the pump 60 to the nozzle. Since the circuitry 78 has just been calibrated to a known source all that is important is to record the dB level detected at a particular air pressure supplied by the pump 60.

The detector 10 comprises a tuning circuit (not shown) that sends the signal to the linear-to-log converter 86. The tuning circuit comprises an electronically variable capacitor that permits the microcontroller 90 to adjust the resonant frequency of the tuning circuit. In this way, the microcontroller 90 may examine any part of the frequency bandwidth of the detector 10.

In order to perform a calibration test, the microcontroller 90 firstly selects the sensor to be tested and then selects a number of different frequencies within the detector bandwidth from the group of frequencies where the detector 10 was calibrated during manufacture. As many points as is deemed necessary can be selected from this group, although a minimum of three is recommended. Moreover, the points should span the frequency range of interest; for example frequencies of 25 kHz, 52 kHz and 80 kHz. Once the tuning circuit has tuned to a particular frequency, the microcontroller 90 initiates the pump to output the same air pressure as in manufacture, in this case $2 \times 10^5$ Pa and the air blast is timed to last for 5 s. The microcontroller 90 looks up in memory the expected sound pressure level at that frequency and compares it to the level received from the electronic circuitry 78. Provided the received level is within a predetermined tolerance (e.g. ±5 dB) of the level stored in memory, the calibration test for that frequency is passed. The same test is then repeated for the remaining frequencies in the range until all are completed. If the test is passed at all frequencies, the microcontroller 90 moves on to test the next sensor. During calibration testing the sensor will be 'deaf' (although any other sensors on the detector continue working). Therefore both the number of frequencies tested and the air blast time for each frequency can be adjusted to suit the particular installation.

If the calibration test indicates that the detector 10 has fallen outside the factory parameters the detector is re-tested a number of times (e.g. two or three) to check the response. If the detector fails after this number of calibration tests a fault condition is registered.

For the forced test and calibration test it is recommended that a pressure of $0.35 \times 10^5$ Nm$^{-2}$ (0.35 bar) minimum is achieved at the pump 60 and at least $0.05 \times 10^5$ Nm$^{-2}$ (0.05 bar) higher than pump pressure at the nozzle 64, although higher pressures are beneficial.

Figure 12:
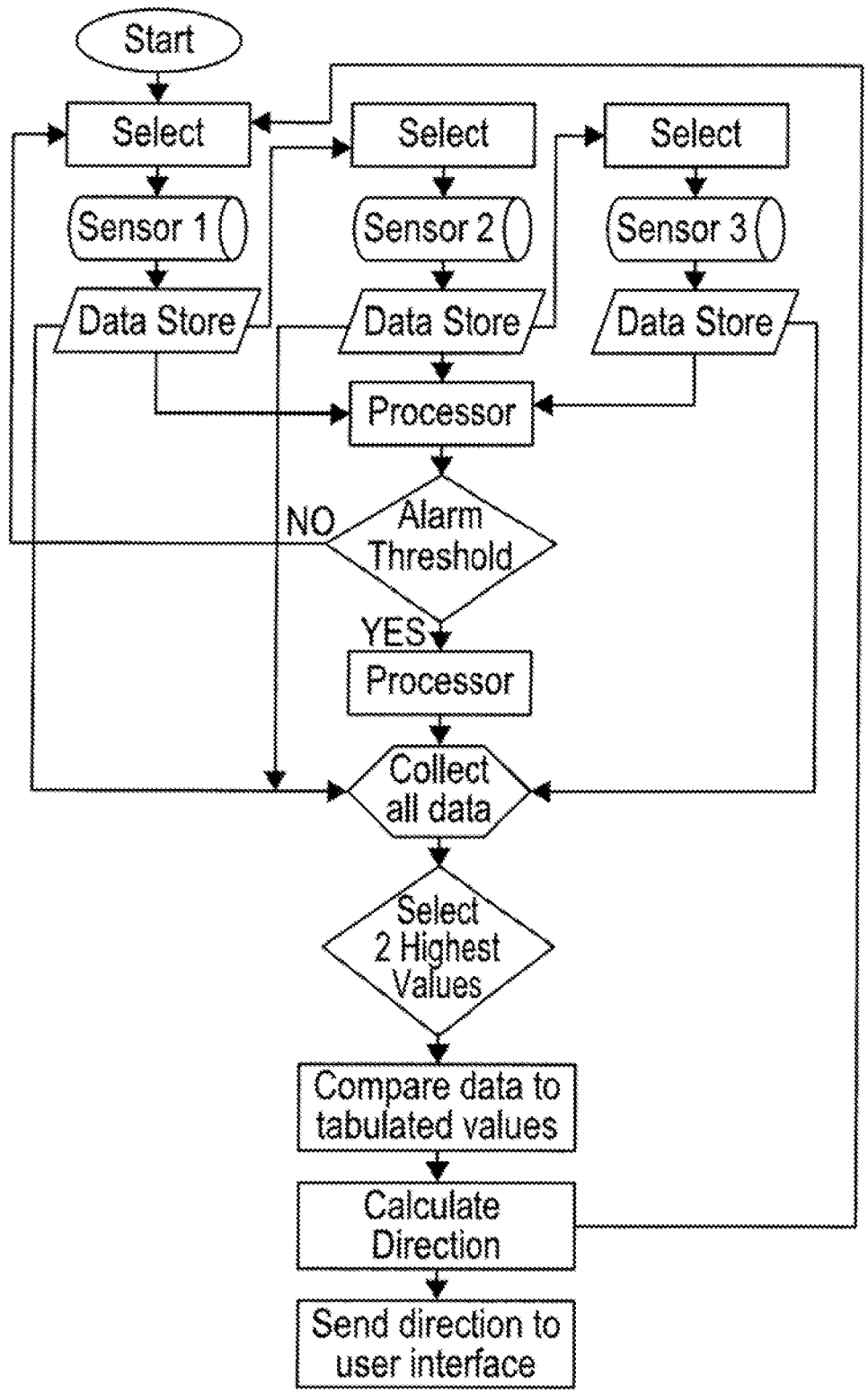
FIG. 12 is a flow diagram showing a gas leak direction estimating method according to the present invention.

The calibration test will be set to conform to existing site maintenance schedules or may be forced by the operator. One particular advantage is that the calibration test is completely self-contained within the detector; therefore it is not necessary to return the detector to the factory or to gain access to the sensing face 30 of each sensor 20 by maintenance personnel. It is also expected that the tolerance levels on a calibration test can be improved. In particular current calibration tolerance is ±5 dB using handheld devices. Since the nozzle 64 is within the detector housing and the pump pressure can be controlled, it is believed that this tolerance can be improved to as little as ±1 dB or perhaps better. This is a major advantage as any drift in the performance of the detector will be identified sooner, improving safety on-site.
Direction To enhance the functionality of the detector 10 the signals obtained from multiple sensors are compared by the microcontroller 90 to provide an indication of the direction of a gas leak. Referring to FIG. 12, data is gathered and processed from each sensor 20 in the manner described above with reference to FIG. 11. If at step S12-1 the microcontroller 90 determines that the alarm threshold has been exceeded the data is gathered from memory for all of the sensors 20. The data is then compared at step S12-2 to find the two highest sound pressure levels to identify the two sensors 20 most closely facing the gas leak.

The background noise level is then subtracted from each of the two highest values. The direction of the gas leak relative to the detector 10 can now be determined by comparing the relative increase of the two sensors above background at step S12-3.

Figure 13:
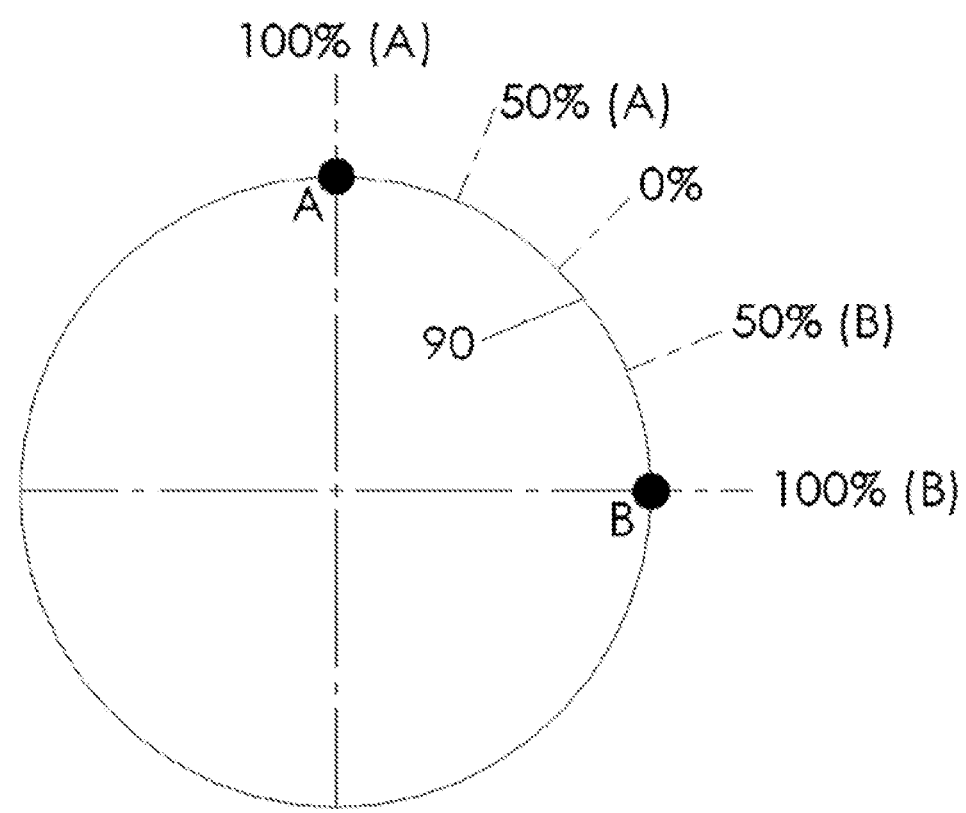
FIG. 13 is a schematic plan view of a detector illustrating the principles applied in the method of FIG. 12.
Figure 14:
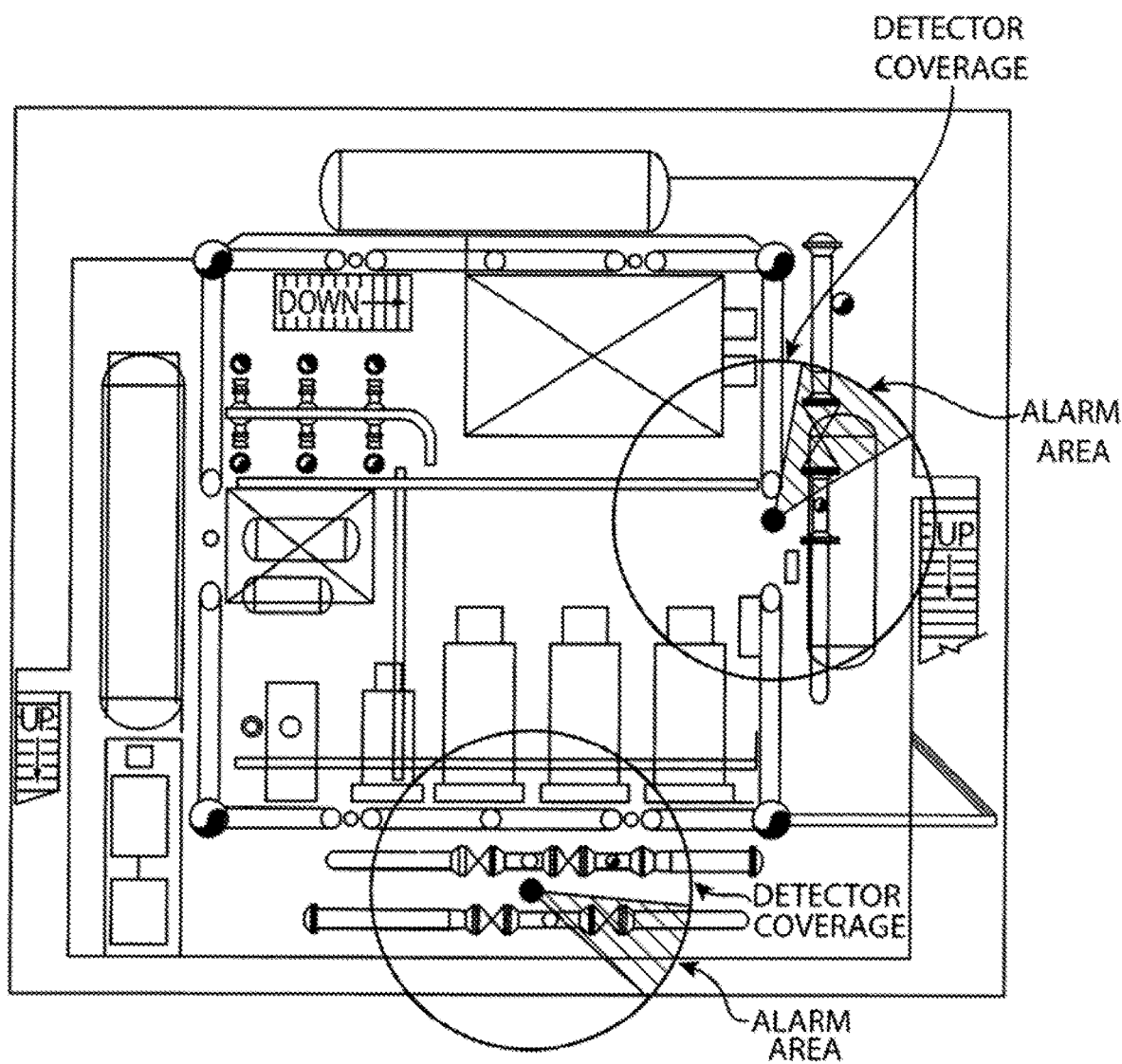
FIG. 14 is a schematic plan view of the site in FIGS. 1A and 1B showing the improved direction estimation.

For example, referring to FIG. 13 two sensors identified as 'A' and 'B' are shown in plan view on their relative positions on the detector housing. The two sensors are at a known angular separation, in this example 90°. To a rough approximation, if the gas leak is directly opposite sensor 'A' in FIG. 13, that sensor will register the full increase in sound pressure level over the background, whilst sensor B will register relatively little. As the angular position of the gas leak changes from opposite sensor A to opposite sensor B, the sound pressure level at A will decrease whilst the sound pressure level at B will gradually increase by the same proportion. At a 45° position the sound pressure levels measured by A and B will be approximately the same. Accordingly, a scale 90 can be envisaged where a gas leak at a 45° position equates to 0% i.e. neither more toward A nor toward B. From that position the increase in proportion of the signal between 45° and 0° (i.e. opposite A) can be represented in percentage terms by comparing the relative increase of sound pressure levels at A and B. Similarly the increase in proportion of the signal between 45° and 90° (i.e. opposite B) can be represented in the same percentage terms.

To obtain the approximate angular position of the gas leak between sensors A and B, the microcontroller obtains the ratio of the smallest increase over background to the biggest increase over background of the two sensors. This ratio can be converted to a percentage and subtracted from the sensor with largest increase over background. This then indicates that the angular position of the gas leak with respect to the sensor that registered the largest increase over background noise.

For example, background level is 50 dB, sensor A registers 70 dB and sensor B registers 60 dB. The relative increases over background are then:

$\Delta A = 20$ dB $\Delta B = 10$ dB

The ratio of the smallest to the largest increase is in this case $\Delta B/\Delta A = 10/20 = 50\%$. The angular position away from the sensor that registered the strongest signal (in this case A) is then given by 100%−50%=50% of the angular distance between A and the equilibrium position (corresponding to 45°). Therefore the gas leak lies at an angle of about 22-23° from A.

These calculation steps could either be performed for by the microcontroller 90 each time a gas leak is detected, or a pre-calculated table could be stored in the microcontroller's memory such as that below:

| Sensor A - Background | Sensor B - Background | Relative Position |
|---|---|---|
| 60 dB | 10 dB | 83% (A) |
| 15 dB | 10 dB | 33% (A) |
| 20 dB | 50 dB | 60% (B) |
| 15 dB | 60 dB | 75% (B) |

The more values stored in the table the more accurate the indication. Of course, it may be sufficient simply to indicate a range of angles that it is expected the gas leak lies within. In that case the table may need only four entries as shown above.

Once a direction of the gas leak has been determined at step S12-4 it is also possible to transmit the result to a remote computer terminal for display on a screen at step S12-5. FIG.

14 illustrates the sort of image that could be displayed to a user. By doing this, the operator may only have to shut down one or two processes in the plant rather than all of the processes at once.

The number of sensors used to determine gas leak direction affects the accuracy of the result: two sensors will provide a rough position, for example left or right with no depth perception; three sensors will enable the microprocessor to perform triangulation; yet more sensors could be added into the calculation to improve accuracy. Other methods for multiple sensor positioning accuracy can be used, such as sine wave angle comparison against sensor face for example; this will enable the number of sensors required to be reduced. Vertical and horizontal offset of sensors on the detector will also enable a greater degree of accuracy. Another method would be to make the detector (or a part thereof) rotatable about a vertical axis so that a sensor may be rotated towards the gas leak until the signal is strongest. One advantage of this is that only a single sensor is required on the detector. 360° coverage may be obtained by rotating the detector over a given period of time e.g. once every 60 s.

Figure 15:
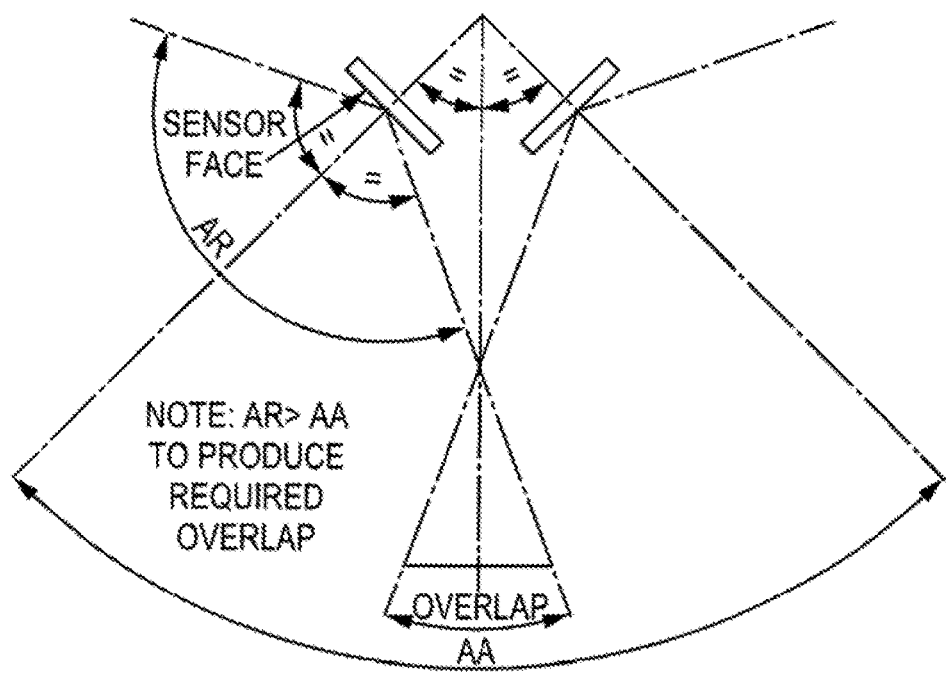
FIG. 15 is a schematic side view of a detector showing the overlap of sensor coverage areas.

When using multiple sensors it is important that the detection angles overlap (for example as shown in FIG. 15) to ensure that there are no 'deaf' spots in coverage. It is also beneficial to keep the sensing faces 30 in angular alignment (45° shown in FIG. 3) to avoid any 'drop-off' in response between sensors. The sensor angle of response AR usually dictates how many sensors are required as a minimum to monitor the area of interest, The angle of response will also dictate the angle of inclination of the sensing faces to provide an overlap to avoid 'deaf' spots.

Frequency Deletion

Figure 16:
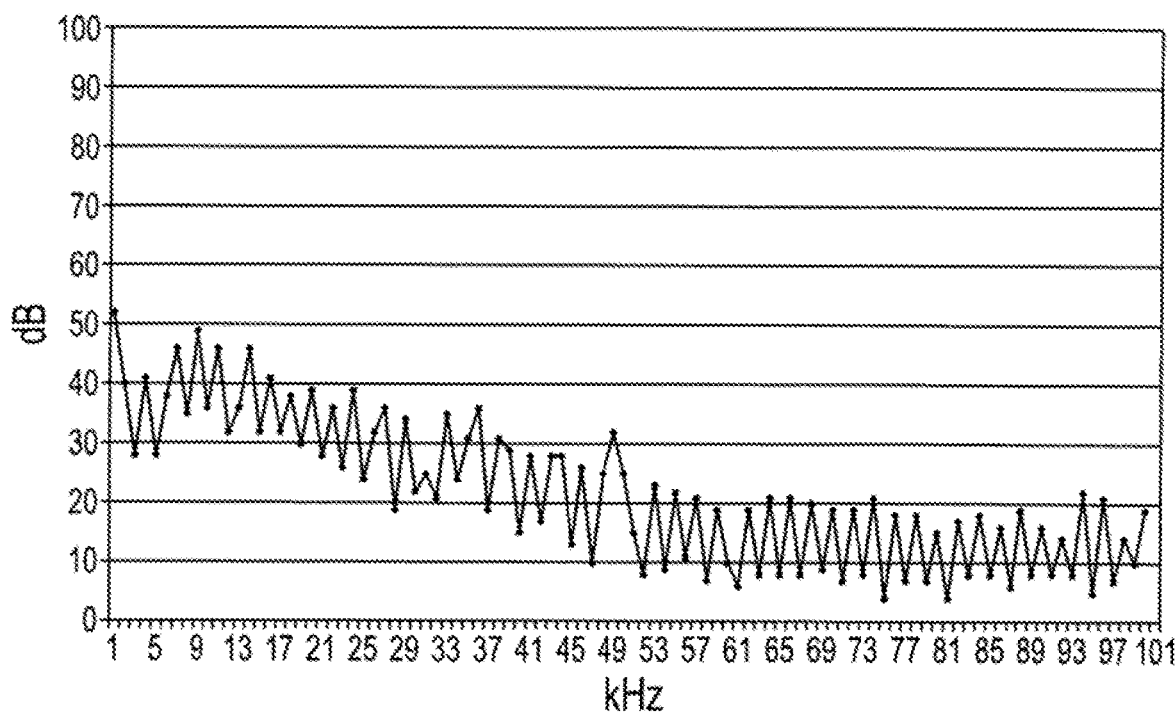
FIGS. 16-20 are various spectra to illustrate the principles of the present invention.
Figure 17:
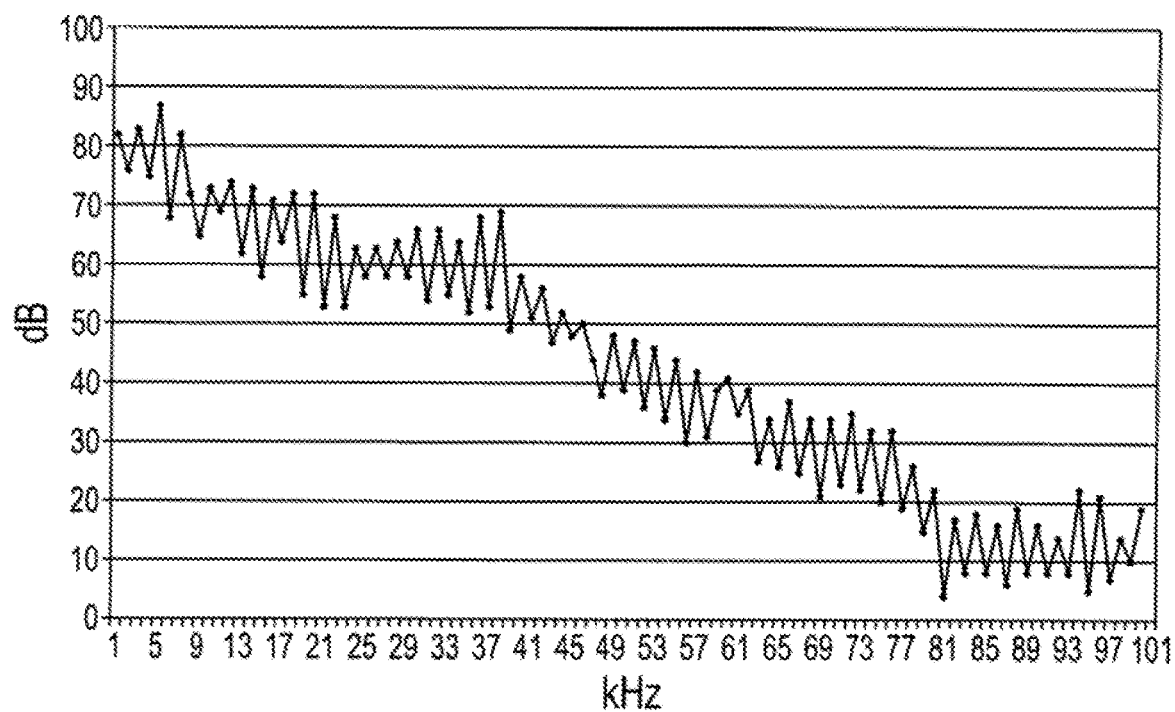
Figure 18:
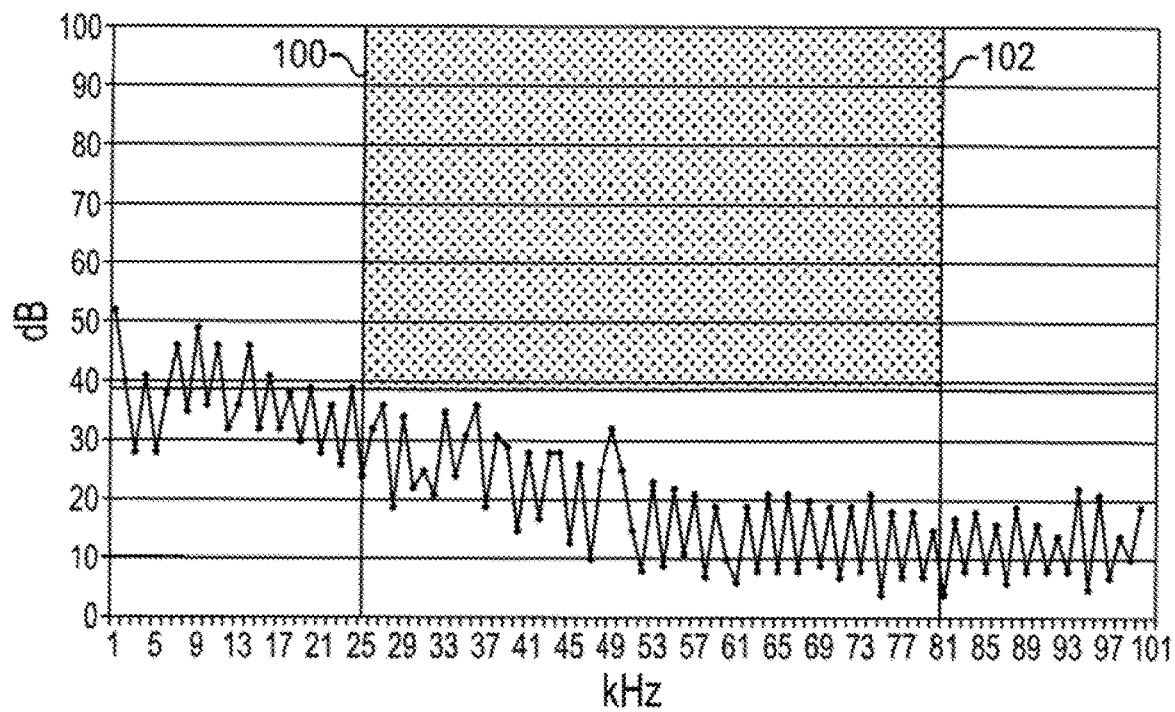

Most significant noise produced in an industrial environment is within the acoustic range (<25 kHz) as shown in FIG. 16. When gas escapes from a pressurised area to atmosphere it produces a more pronounced broadband spectrum as shown in the example in FIG. 17. For this reason current forms of fixed ultrasonic detectors usually operate at frequencies in the ultrasonic range only, typically 25 kHz to 80 kHz as shown by the vertical lines 100, 102 in FIG. 18.

Figure 19:
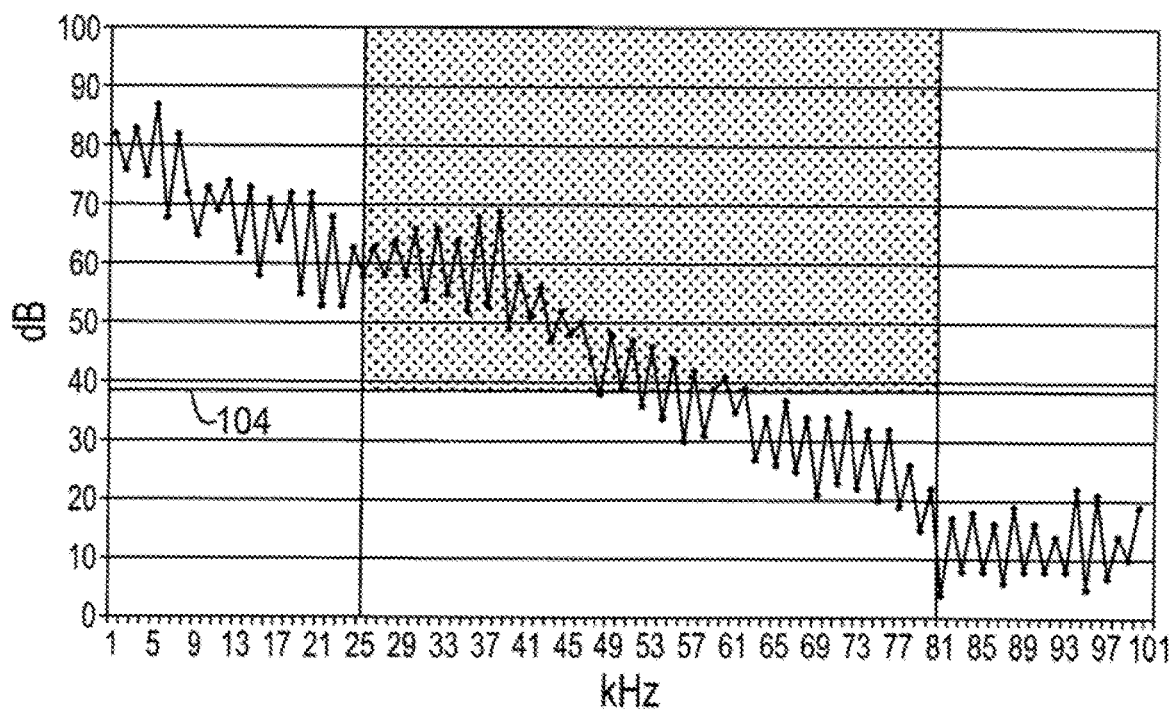

Detector alarm Levels are set based upon the background noise level found in the operating frequency range. The alarm level is usually in the region of 6 dB higher than the peak background noise. FIG. 19 shows values for a typical background with the shaded area representing detector coverage 25 to 80 kHz and noise alarm level 104 set at 39 dB. As can be seen in FIG. 19 a pressurised gas release has caused frequencies of sufficient magnitude to enter the shaded area thereby triggering an alarm. As explained above a delay is normally used before triggering an alarm to reduce the chance of an alarm being caused by intermittent noise spikes. The delay is typically 5 seconds to several minutes, depending on site conditions.

Figure 20:
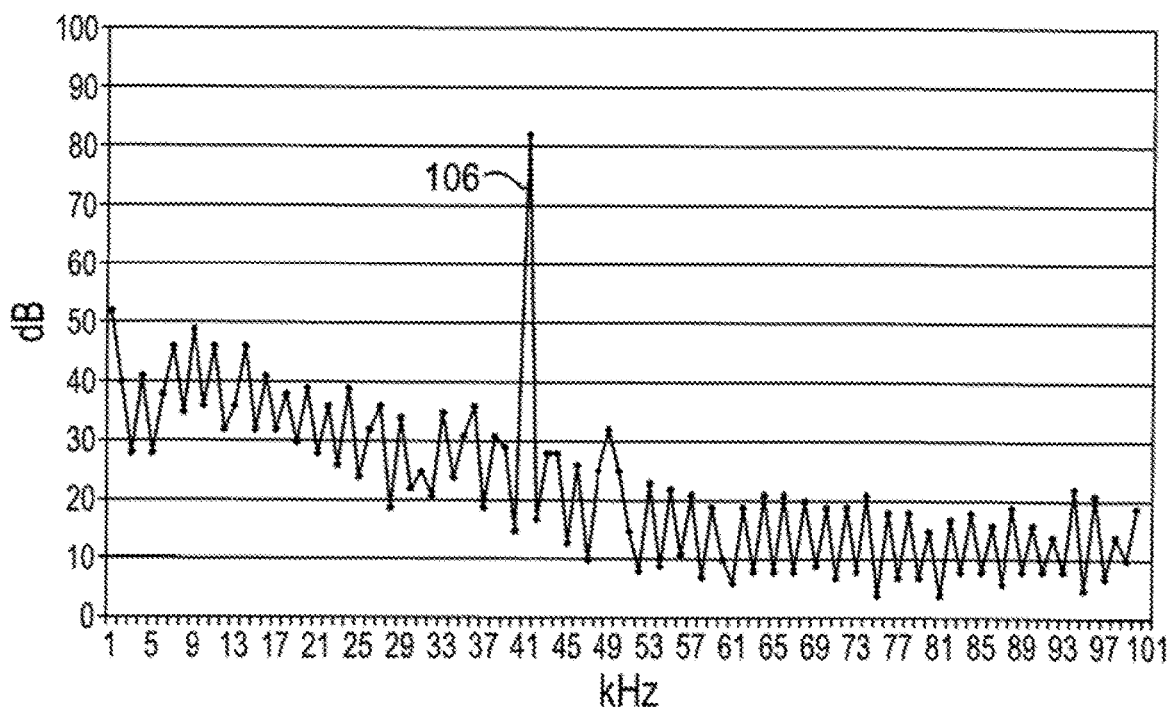

FIG. 20 shows a typical background environment which contains a continuous unwanted noise spike 106 produced by a non-pressurised gas release. In this example the spike is caused by a faulty bearing in process machinery. The background noise would be too high for too long in this case to warrant safe use of an ultrasonic detector; a detector could be used, but the safe sensing distance would be greatly reduced.

Figure 21:
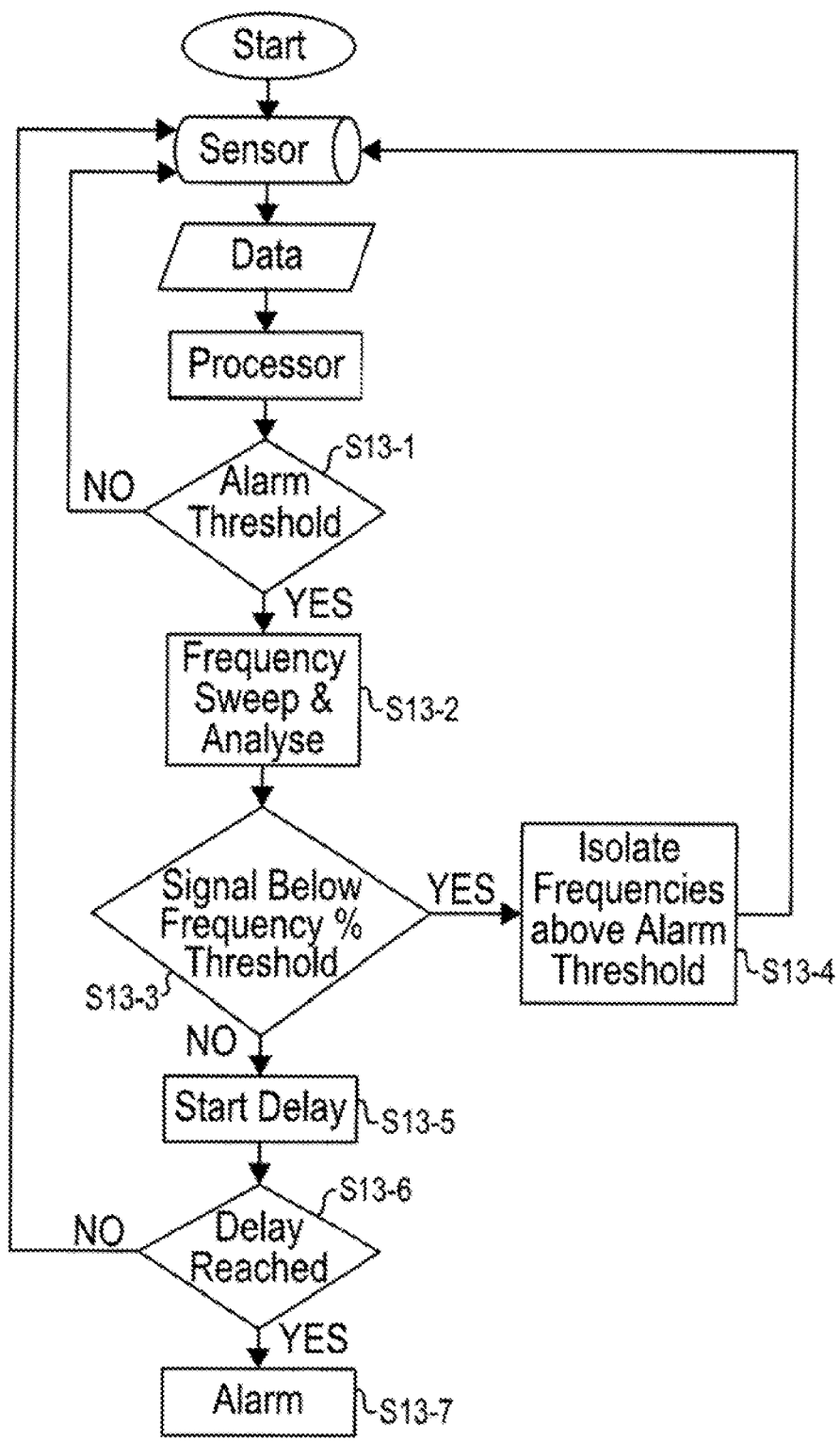
FIG. 21 is a flow diagram showing a frequency removal method according to the present invention.

Using electronic filters (e.g. one or more band stop filter) it is possible to remove one more unwanted frequency range from within the detection range. Referring to FIG. 21 a frequency deletion method performed by the detector is shown. The first part of the method is similar to those described above in which the microcontroller 90 gathers data from a sensor and determines if the sound pressure level of the whole bandwidth (25 kHz-80 kHz) exceeds the alarm threshold (step S13-1). If the threshold is exceeded the microcontroller uses the aforementioned tuning circuit to sweep up (or down) the frequency range to determine whether or not there are any spikes of ultrasonic noise. In particular at step S13-2 the microcontroller 90 examines each frequency in turn and determines whether or not the sound pressure level at that frequency is above the alarm threshold. If it is, the frequency is stored and the next frequency examined. If it is not, the microcontroller simply moves to the next frequency.

Figure 22:
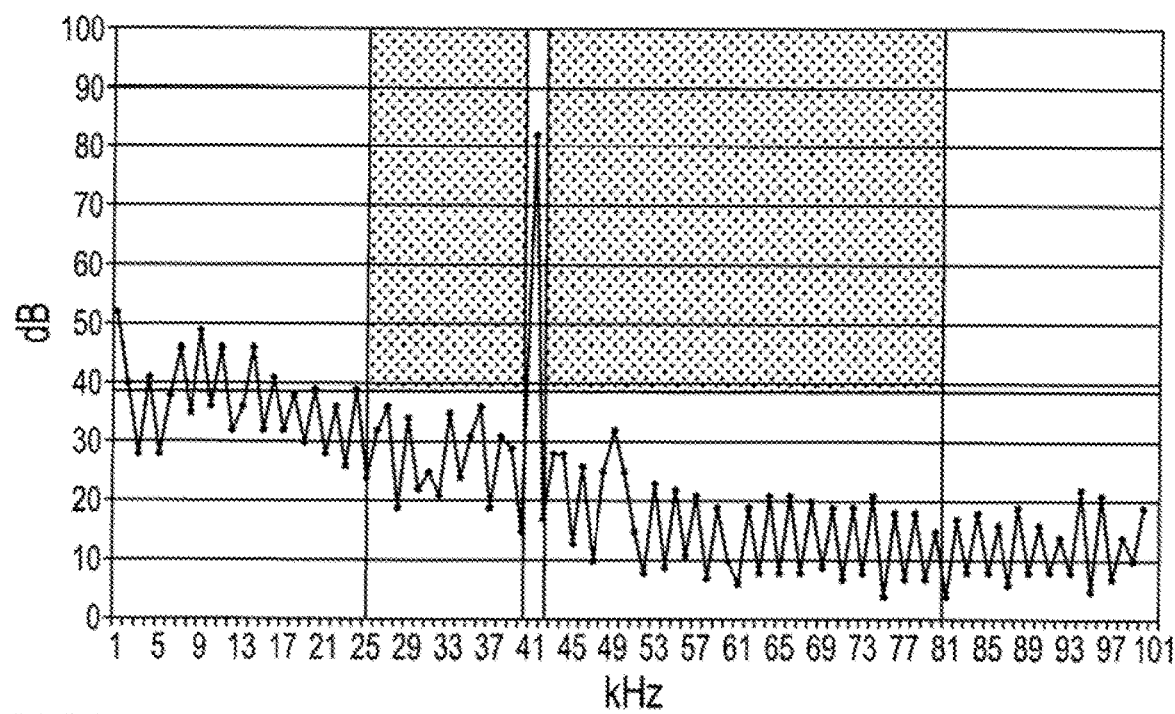
FIGS. 22-27 are various spectra illustrating the principles and results of the present invention.

The storage of frequency values above the alarm threshold enables the microcontroller to determine the total 'alarm bandwidth' the signal that is above the alarm threshold. The alarm bandwidth is then compared against the bandwidth of the detector at step S13-3 to determine what percentage of the entire range it represents. The microcontroller 90 stores a 'frequency percentage threshold value' (FPTV) in memory against which the alarm bandwidth is compared. If the alarm bandwidth is lower than the FPTV this indicates that the spectrum contains one or more spike caused something other than a gas release and that it is safe to remove that bandwidth from inspection by the microcontroller 90. The microcontroller adapts the electronic filters to remove the or each part of the frequency range contributing to the alarm bandwidth at step S13-4. FIG. 22 shows a frequency spike 106 that has been removed from the detector's frequency range. Of course, upon repeating the method, if a spike no longer appears above the alarm threshold, that bandwidth can be added back to the inspection range of the detector 10.

If however the alarm bandwidth exceeds the FPTV, this indicates that detected sound might be a gas leak. Accordingly the microcontroller 90 does not remove any part of the alarm bandwidth from the detection range and instead proceeds to step S13-5 where a time delay is commenced. The method repeats until the time delay expires at step S13-6. If the alarm bandwidth is still above the FPTV, the detector 10 enters an alarm condition at step S13-7.

Figure 23:
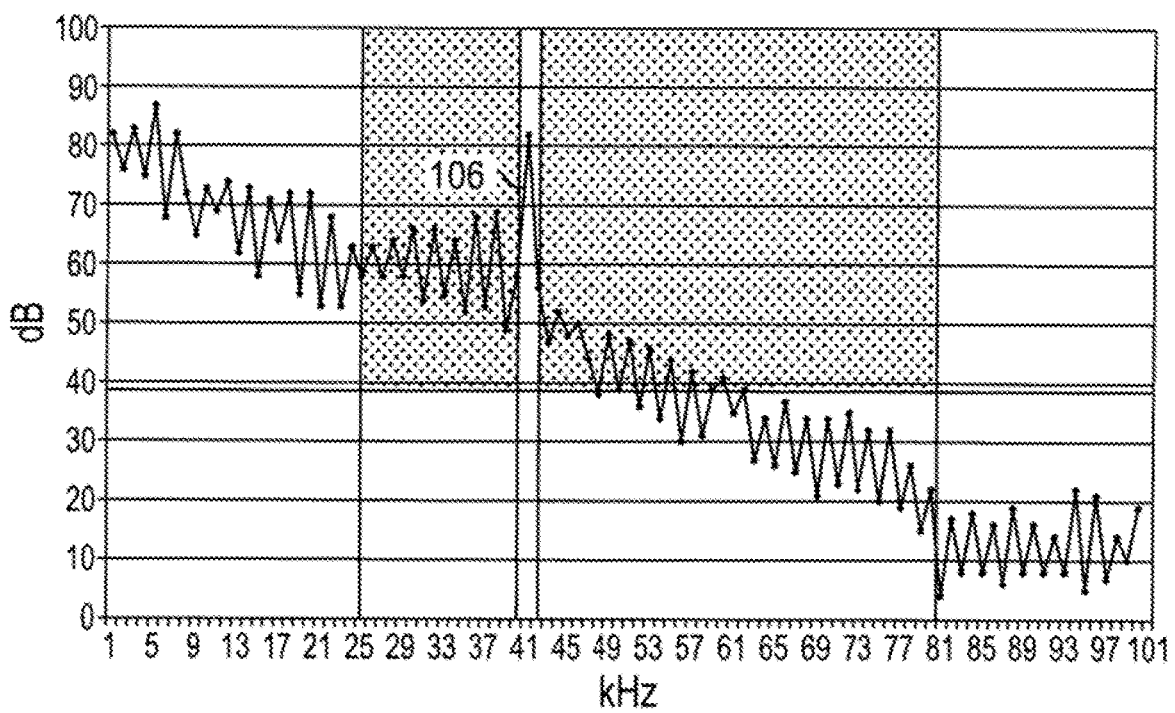

In this way the detector is able to remove certain frequencies from the frequency detection range. Whilst this reduces the overall detection bandwidth it still permits a broadband gas release to be detected as shown in FIG. 23.

Figure 24:
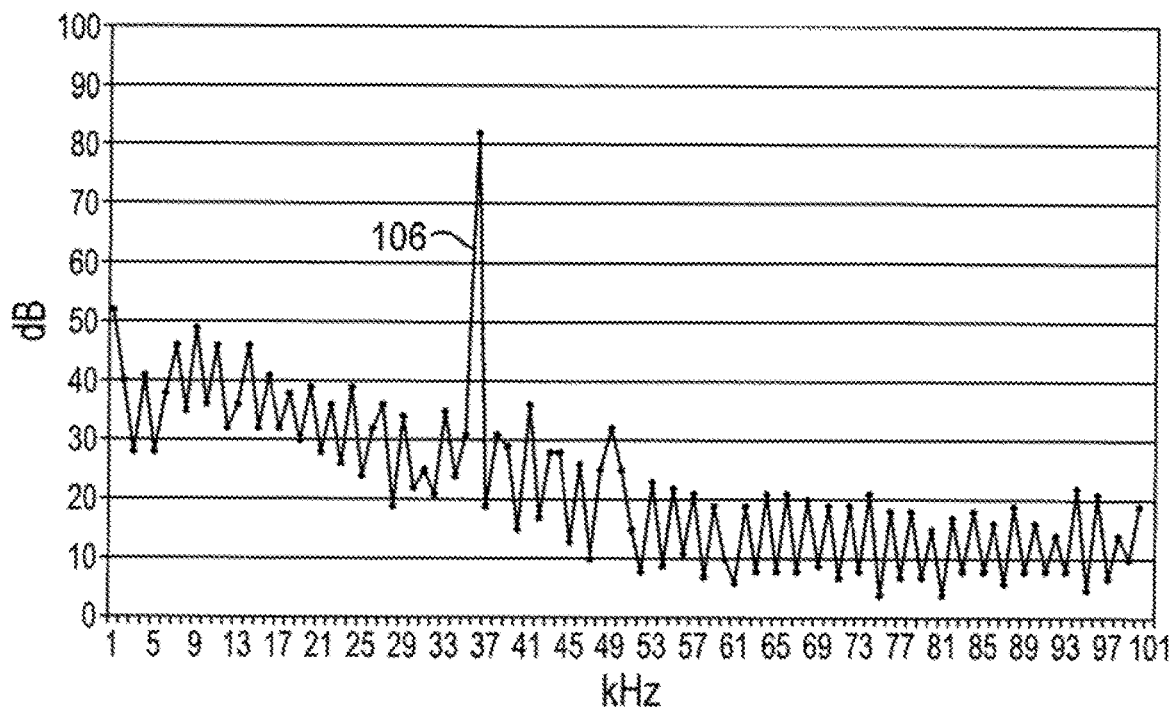
Figure 25:
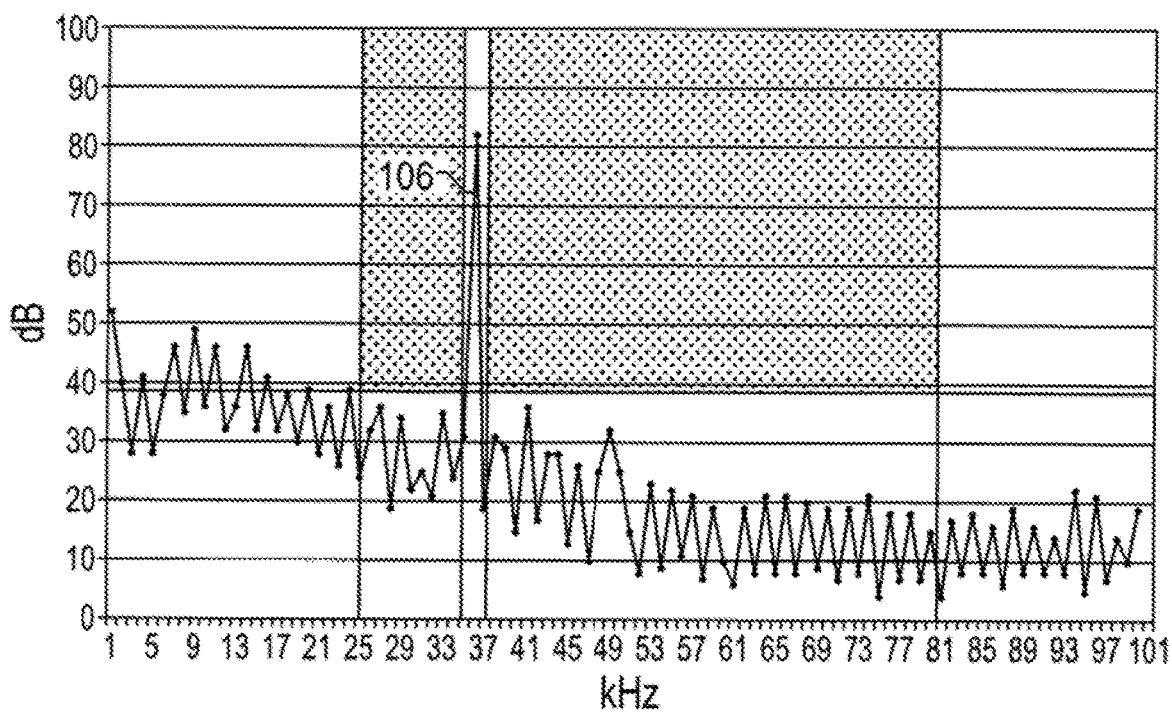

Mechanical noise produced by machinery can shift centre frequency as wear continues: the centre frequency can increase or decrease depending upon the fault, as illustrated by FIG. 24. The initial noise spike in FIG. 20 was at 40 kHz but has decreased to 36 kHz in FIG. 24. However, repeat performance of the method enables the deleted bandwidth to shift as well. FIG. 25 shows the spike 106 having moved to a centre frequency of 36 kHz and the deleted bandwidth having moved as well.

Figure 26:
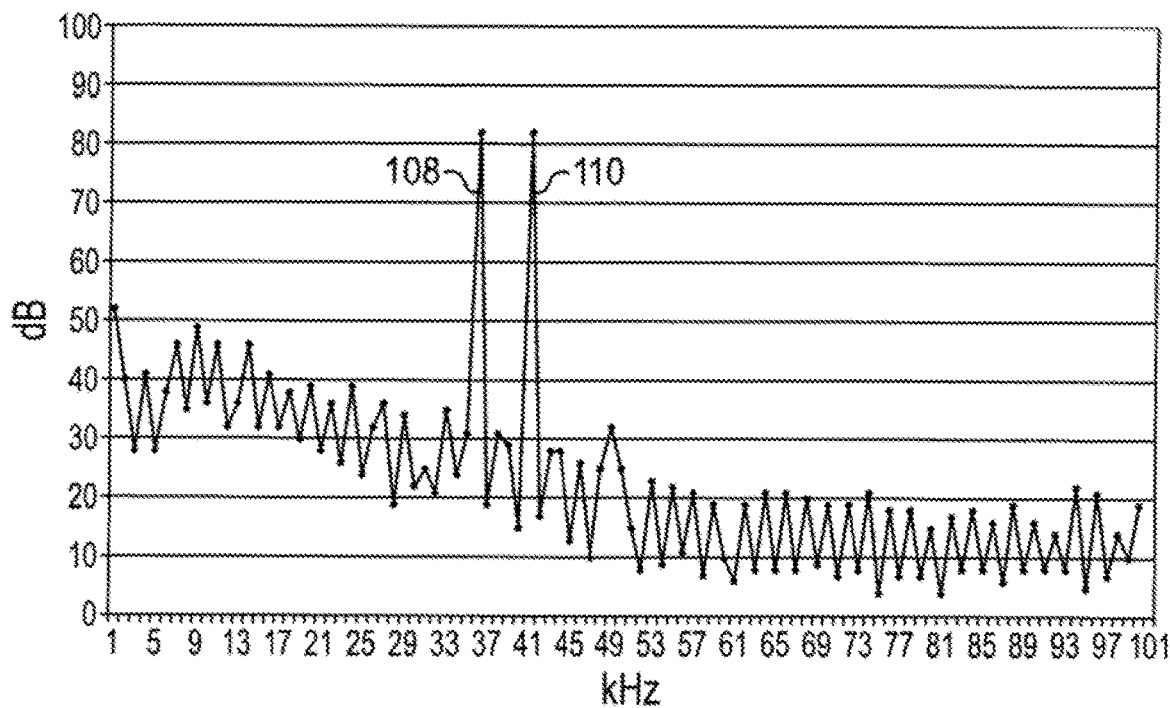
Figure 27:
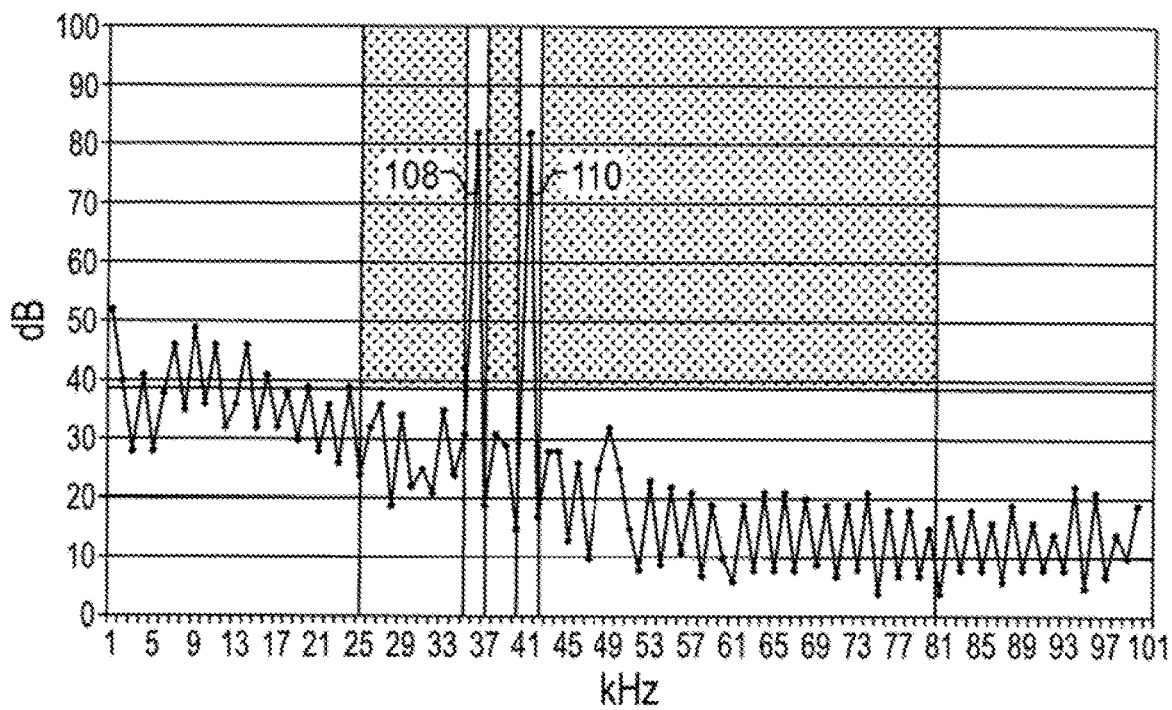

As mentioned above, using this method it is possible to eliminate multiple frequencies to avoid a number of spikes in the background noise. FIG. 26 shows two spikes 106, 108 that might be caused by multiple machinery or audible alarm resonance for example. FIG. 27 shows detector response to multiple spikes and adjusts the alarm shaded area to avoid false alarms.

The FPTV is site specific and is dependent amongst other things on the nature of the background ultrasonic noise, the attitude of the plant operator and in the future might depend on government regulations. For example, if during the survey of the site only one ultrasonic peak is located, it might be possible for set the FPTV to 5% of the frequency range for example. If several spikes are detected it might be necessary to increase the FPTV up to 50% to ensure no false alarms.

Upon detection of a narrowband spike of noise it is envisaged that the detector may be configured to warn the operator of the plant via an appropriate alarm signal that the spike has been detected. It is also possible, using any of the direction estimation methods described above, for the detector to provide an output indicating the direction of the spike relative to the detector. In another alternative the detector may be provided only with this functionality i.e. to monitor only for such noise spikes, and not to monitor for gas leaks.

Whilst this embodiment has been described in connection with a detector comprising four sensors, it will be appreciated that the principles of the invention can be applied to a detector comprising one, two, three or more sensors.

Figure 28:
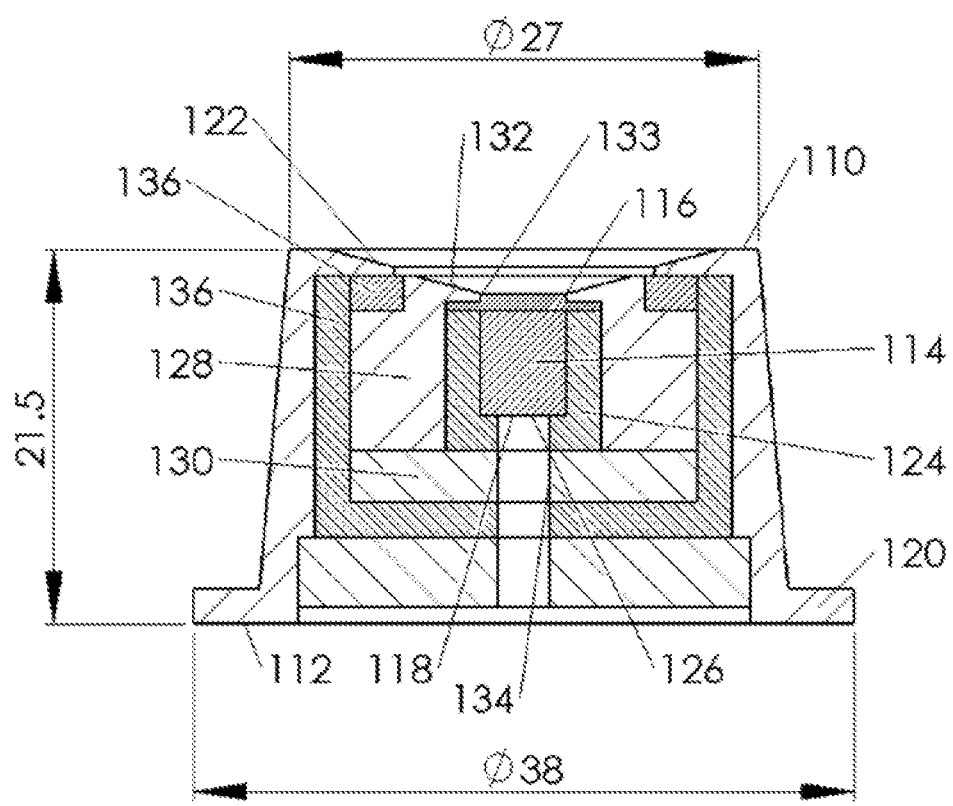
FIG. 28 is a schematic cross section of a sensor according to the present invention.

Referring to FIG. 28, an embodiment of an ultrasonic sensor is generally identified by reference numeral 110. The overall dimensions of the sensor 110 in mm are shown in the Figure. The sensor 110 comprises a mounting face 112 that enables it to be mounted on a body (not shown), for example a handheld detector device or a detector intended to be mounted in a fixed position, such as the detector 10 described above. The construction of the sensor 110 described below can be used for a sensor 20 of the detector 10.

A piezo electric 114 crystal is sized as described above in respect of the piezoelectric crystal 20. Firstly, a shape and material of the piezoelectric crystal is chosen; in this example a rod or cylindrical shape chosen due to its ready availability from manufacturers, and the material is PZTA1 which is a type of lead zirconium titanate. Other shapes and materials are possible as described in greater detail below. Manufacturers give frequency constants for particular shapes and these are also readily available on data sheets. In this case the frequency constant $N_3$ is 1410 Hz·m. The length of the crystal (i.e. in the up and down direction of FIG. 28) is then determined by the frequency range to be detected. In this embodiment the sensor 110 is intended to detect ultrasound in the range 25 kH2-80 kHz. The resonance frequency $v_r$ of a piezoelectric is related to its length L as $v_r = N/L$, where N is the longitudinal mode frequency constant. The length of the crystal L to avoid a resonance point in the detection frequency range (which would otherwise distort linearity) is given by:

$$\frac{N_3}{v_{high}} \leq L \leq \frac{N_3}{v_{low}}$$

where $v_{high}$ is the upper limit of the frequency range to be detected and $v_{low}$ is the lower limit of the frequency range. In this example, the length L to be avoided is between 17.6 mm and 56.4 mm. In view of the typical sound pressure levels of pressurised gas releases, and materials cost, it is preferred to choose a resonance frequency that is greater than the highest frequency of the frequency range to be detected, resulting in a shorter length rather than a longer length. This is because the pressure levels are lower at high frequencies and smaller crystals are generally cheaper.

The next step is to determine the width of the piezoelectric 114. In particular, the piezoelectric 114 has a sensing face 116 and, to improve sensitivity, the area of the sensing face 116 should be as large as possible, subject to the following criterion. To reduce the risk of destructive interference between sound waves at the sensing face 116, it is advisable to keep the longest dimension across the face below twice the shortest wavelength of ultrasound that is to be detected. In this case the shortest wavelength is 4 mm at 80 kHz. Therefore the sensing face 116 has a longest dimension of, ideally, just under 8 mm, say 1.9 mm, for an upper limit in the frequency range of 80 kHz.

In order to reduce cost, an off-the-shelf piezoelectric can then be selected which meets the criteria of length and width. For example a piezoelectric in PZTA1 of 6 mm diameter (i.e. a circular sensing face 116) and 6 mm length could be used, which is currently available from Morgan Electro Ceramics, Inc. Such a crystal has a resonant frequency of 242 kHz+/−3% i.e. above the frequency range of the sensor 110.

The preferred shape of the sensing face 116 is circular, but any other shape will work in principle (e.g. oval, triangular, square, rectangular, pentagonal, hexagonal, etc.) providing that the longest dimension is no greater than about twice the shortest wavelength to be detected. A circular shape provides the greatest sensitivity whilst reducing the risk of interference of sound waves.

The piezoelectric 114 may comprise any piezoelectric materials, including: crystals such as quartz ($SiO_2$), berlinite ($AIPO_4$), gallium orthophosphate ($GaPO_4$) and tourmaline; ceramics including barium titanate ($BaTiO_3$) and lead zirconium titanate; zinc oxide (ZnO), aluminium nitride (AN), polyvinyldene fluoride (PVDF), lithium tantalite, lanthanum gallium silicate, potassium sodium tartrate; and ceramics with perovskite tungsten-bronze structures, including $BaTiO_3$, $KNbO_3$, $Ba_2NaNb_5O_5$, $LiNbO_3$, $SrTiO_3$, $Pb(ZrTi)O_3$, $Pb_2KNb_5O_{15}$, $LiTaO_3$, $BiFeO_3$ and $Na_xWO_3$. In this embodiment the piezoelectric 114 comprises a polarised crystal structure with the dipoles aligned along the vertical axis in FIG. 28. In this way the deformation of the crystal by sound waves impinging on the sensing face 116 is constrained to this vertical axis. Whilst the use of a polarised crystal is not essential, it is nonetheless preferred as the sensitivity of the crystal reduces with a decrease in polarisation.

To further help a single crystal i.e. the piezoelectric 114 to produce linear results it is necessary reduce or eliminate vibrations and all other forms of spurious noise. To that end the piezoelectric 114 is mechanically and electrically isolated from a housing 120. The housing 120 comprises a generally cylindrical hollow body made from a material suitable for protecting the sensor 110 from damage in the working environment. In a detector intended to be mounted in a fixed position (such as the detector 10) it is preferable to use stainless steel or similar, whilst in a portable handheld unit, aluminium or engineering plastic such as polyoxymethylene (also known as DELRIN®) may be used. If made in stainless steel the overall weight of the sensor 110 is about 86 g, whereas if it is made in DELRIN® the overall weight is about 1.5 g. The housing 120 has an opening 122 for indirectly exposing the sensing face 116 to the external environment when in use. Around the opening 122 the housing slopes upwardly at an angle of about 9° relative to the plane defined by the sensing face 116. This helps to reduce sound waves that are reflected on the housing 120 from impinging on the piezoelectric 114. It is not essential that the angle of the slope is 9°; any angle between about 0° and 45° will suffice.

We have realised that the piezoelectric 114 can be suspended in the housing 120 by one or more type of material, which material is of sufficient firmness to hold the piezoelectric 114 in place, but which permits deformation of the piezoelectric under the influence of sound pressure waves substantially without damping in the frequency range of interest, in this case between about 25 kHz and 80 kHz. However, at the same time the material(s) does provide a mechanical damping function of the whole piezoelectric 114 over at least some frequencies outside that the sensing frequency range; in this way the piezoelectric 114 is shielded against knocks to the housing 120 or other low frequency physical vibration caused by motors, etc. We have found that open or closed cell foam materials have produced the best results. In this embodiment a first closed cell foam ring 124 surrounds the curved outer surface of the piezoelectric 114 and a shoulder part of the ring 124 extends over part of the lower, positive face 118. In this way an opening 126 is provided in the foam ring 124 for attachment of a cable (not shown) to an electrode (not shown) on the positive face 118.

During investigation for suitable materials to electrically isolate and eliminate mechanical vibrations between the piezoelectric crystal 114 and the Faraday cage (described in greater detail below) a number of materials with different densities were tested with varying results.

The initial tests were undertaken using materials that were readily available. All were manufactured to form a tube with an outer diameter of 9 mm and an inner diameter of about 4.9-5 mm, and with a length of 6 mm. The piezoelectric crystal 114 was inserted into the material and then both inserted into a metal case acting as a Faraday cage. The whole assembly was then tested to ascertain sensitivity values for pressurised air leaks along with the effects of vibration. The materials tested were: PTFE, neoprene rubber, A340 expanded cross-linked closed cell polyethylene foam, SE533 silicone sponge, A311 closed cell expanded neoprene foam, EPDM sponge rubber, A350 expanded polyurethane foam and EPS100 expanded polystyrene.

Testing was undertaken with a 40 kHz sound source producing 100 dB at 1 m distance. Sensitivity readings were found to be reduced as material density increased, although a plateau of maximum sensitivity was noticed.

PTFE (2200 kg/m$^3$) and neoprene rubber (1400 kg/m$^3$) both reduced the output signal by >25%, whilst SE533 silicone sponge (530 g/m$^3$) reduced the signal by 15%. A311 closed cell expanded neoprene foam (150 kg/m$^3$) and EPDM sponge rubber (140 kg/m$^3$) were both within a 0.5% reading, whilst A350 expanded polyurethane foam (30 kg/m$^3$) and EPS100 expanded polystyrene (20 kg/m$^3$) were within a 3% reading. Normally a 0-5% drift in the measured dB level of the sound source is acceptable and can be removed using the gain of the electronics during calibration. However we have discovered that there is a range of densities that have a very minor effect (e.g. less than 0.5%) on the output signal from the piezoelectric 114. This range of densities would appear to be about 140 kg/m$^3$ up to 150 kg/m$^3$. However, it is expected that the actual workable range of densities is wider than this, lying somewhere between 20 kg/m$^3$ and 530 kg/m$^3$; further testing as described above of different materials would readily establish the actual workable range. Furthermore, the workable range might be slightly different according to the material of the piezoelectric 114.

Testing was then undertaken to assess the effects of vibration on the assembly. The assembly was placed upon a flat metal surface, with the piezoelectric crystal sensitivity direction orientated vertically, ensuring the Faraday cage was isolated. The flat metal surface is to simulate the enclosure or mounting surface to which the sensor would be attached when used in industrial environments. Two tests were then undertaken with each type of material to assess the resistance to vibration. The first was to drop a 1 kg weight from a height of 1 m onto the plate approximately 100 mm from the sensor. A jig was set up to ensure repeatability and results followed a similar pattern as per the sound test. The more dense the material, the larger the spike reading produced or 'jolt' experienced by the piezoelectric crystal 114, as would be expected. Although such spikes are acceptable in the context of detector use due to the alarm delay (i.e. the detected signal has to be of a certain duration before an alarm condition is triggered), it is advisable to limit the impact of mechanical force upon the piezoelectric crystal 114 as this will stress the solder connection points. After the drop test the sensor was subjected to the 40 kHz sound source at 100 dB at 1 m. The versions of the sensor comprising the A350 expanded polyurethane foam and EPS100 expanded polystyrene produced readings reduced >30% from the actual expected value. Upon inspection it was found that the crystal had moved downwards inside the assembly and it was determined that this was because the A350 and EPS100 materials were not of sufficient rigidity to hold the piezoelectric crystal 114 in position. The sensors were re-assembled and the second test (described below) was performed on all assemblies.

The second test was conducted to simulate a constant vibration using an electric motor bolted to the flat metal surface with an off centre mass on the driveshaft. The motor was then powered using different voltages to increase the RPM of the driveshaft. At speeds below 10000 RPM all sensors showed little increase in output signal. Above 10000 RPM the denser materials (above 500 kg/m$^3$) started to show elevated signal. The motor was taken up to 35000 RPM with increased signal output signal shown using all materials apart from the A311 closed cell expanded neoprene foam (150 kg/m$^3$) and EPDM Sponge Rubber (140 kg/m$^3$) where the output signal remained fairly constant.

The sensors were then subjected to the noise source and the once again the A350 expanded polyurethane foam (30 kg/m$^3$) and EPS100 expanded polystyrene (20 kg/m$^3$) had lost sensitivity. When taken apart it was noted that the crystals had again moved downwards.

It was therefore deduced that an acceptable density to limit most external influences is in the ratio of 1:50 and 1:60 piezoelectric crystal to mounting material. It appears that lower densities do not support the weight of the crystal whilst higher density materials tend to transport the vibrations straight to the piezoelectric crystal 114.

In this embodiment the piezoelectric 114 is made from lead zirconium titanate PZT5A1 which has a density of 7750 kg m$^{-3}$ and the closed cell foam ring 124 comprises expanded EPDM sponge rubber (closed cell) which has a density of 140 kg m$^{-3}$ (presently available from RH Nuttall Ltd., www.rhnuttall.co.uk amongst others). This gives a crystal to foam density ratio of 1:55. As the foam is closed cell it will also act as a pressure barrier between the positive and negative sides of piezo crystal 114 so that sound waves are inhibited from reaching the positive side of the crystal other than through the negative sensing face.

The piezoelectric 114 also needs to be insulated from other spurious noise, such as electromagnetic radiation from power supplies, radio waves etc. Whilst the piezoelectric 114 needs to be indirectly open to air at the negative end (i.e. sensing face 116) to measure sound pressure level changes, it is important to shield the rest of the crystal using a Faraday cage 128, 130. In this embodiment the Faraday Cage comprises aluminium, although other electrically conductive materials can be used depending on environment. The Faraday cage 128, 130 comprises an opening 132 which is the same diameter and shape as the sensing face 116 of the piezoelectric 114. The shape of the Faraday cage adjacent the opening 132 is substantially the same as that of the housing 120 as described above, and the same range of angles for the sloping face is also applicable. A small vertical face 133 of the Faraday cage 128 adjacent the sensing face 116 is preferably no greater in depth than one half the minimum wavelength to be detected, which in this case equates to about 2 mm. This helps to reduce the number of sound waves reflected onto the sensing face 116 which reduces nulls and lobes in the response of the piezoelectric. Other than the opening 132 the Faraday cage 128, 130 completely encloses the rest of the crystal except for an opening 134 for cable access to the piezoelectric negative face 118.

The Faraday cage 128, 130 is then electrically connected to the negative side (i.e. sensing face 116) of the piezoelectric 114 and subsequently to a pre-amplification module, as described in greater detail below. The closed cell foam ring 124 also acts as an electrical isolator between the body of the piezoelectric 114 and the Faraday cage 128, 130.

The Faraday cage 128, 130 is then electrically isolated from a main enclosure to allow handling or installation, for example into a detector like the detector 10. It is also preferable, but not essential, to further isolate the piezoelectric 114 from vibrations at this point. To that end a second closed cell foam ring 136 is provided a around the Faraday cage 128, 130 to separate it from the housing 120; the foam ring 136 comprises a cylindrical portion and a base portion, the latter extending under the base of the Faraday cage 130. The foam ring 136 acts as an electrical isolator and provides extra vibration isolation between the housing 120 and the Faraday cage 128, 130. The size, thickness and material of the foam ring 136 to eliminate vibrations is application dependant, but is based upon the natural resonant frequency of the Faraday cage 128, 130 (which in this embodiment is greater than 100 kHz) and the nature of the vibrations that the sensor 10 will be exposed to. The foam ring 136 may or may not comprise the same material as the foam ring 124. In this embodiment the sensor 10 thus comprises a two stage vibration damping mechanism comprising first and second foam structure; in areas of extreme vibration the vibration damping mechanism can be increased to a three or more stage system using further dampers. In this embodiment the foam ring 136 comprises EPDM sponge rubber, although many alternatives are possible. However, closed cell expanded foam is recommended for applications where ingress protection is needed against opening 122 (although its use is not limited to this application), The function of the foam ring 136 could be provided by a wide range of other constructions including, but not limited to any material previously mentioned for the foam ring 124, softwood, gel, springs, vibration mounts etc.

A further advantage of using closed cell foam for vibration and electrical isolation is the ability to seal against moisture and contaminants when required by the application. The clamping force required to compress the foam to seal to the required ingress protection rating is application dependant, but the following should be taken into account. The compression percentage of the foam will have an impact on the vibration isolation as well as the ingress protection rating. Testing found that an increase in ingress protection requirement results in an increase of foam density with a recommendation that foam compression is kept below 50% of free thickness.

The closed cell foam provides environmental protection around the Faraday cage 128, 130 but provides no protection for the sensing face 116. To seal the sensing face 116 and avoid a loss of sensitivity, a coating is required that is resistant to the environment, electrically inert, and can seal to the sensing face 116 without forming any air pockets. The present embodiment uses a flexible hard setting rubber compound that, before setting, is flowable with low viscosity to allow shallow section 138 to be formed. For ease of manufacture a suitable type of compound is a room temperature vulcanising silicone rubber; one example that has been found is Flowsil FC sold by Intek Adhesives Ltd. The compound should be applied using a fill line to form a layer of between about 0.5 mm and 1 mm thick over the sensing face 116, although other thicknesses are possible.

The seal 138 affects the frequency response characteristics of the piezoelectric 114, although it has been found that using a compound with a specific gravity of about 1.5 g/ml or less causes negligible performance loss. To check the response characteristics, the piezoelectric 114 is calibrated during manufacture using a known sound source at a known distance from the piezoelectric 114 at five points across the frequency range of the sensor 10. The zero and gain on the pre-amp are then trimmed to within set limits.

Figure 29:
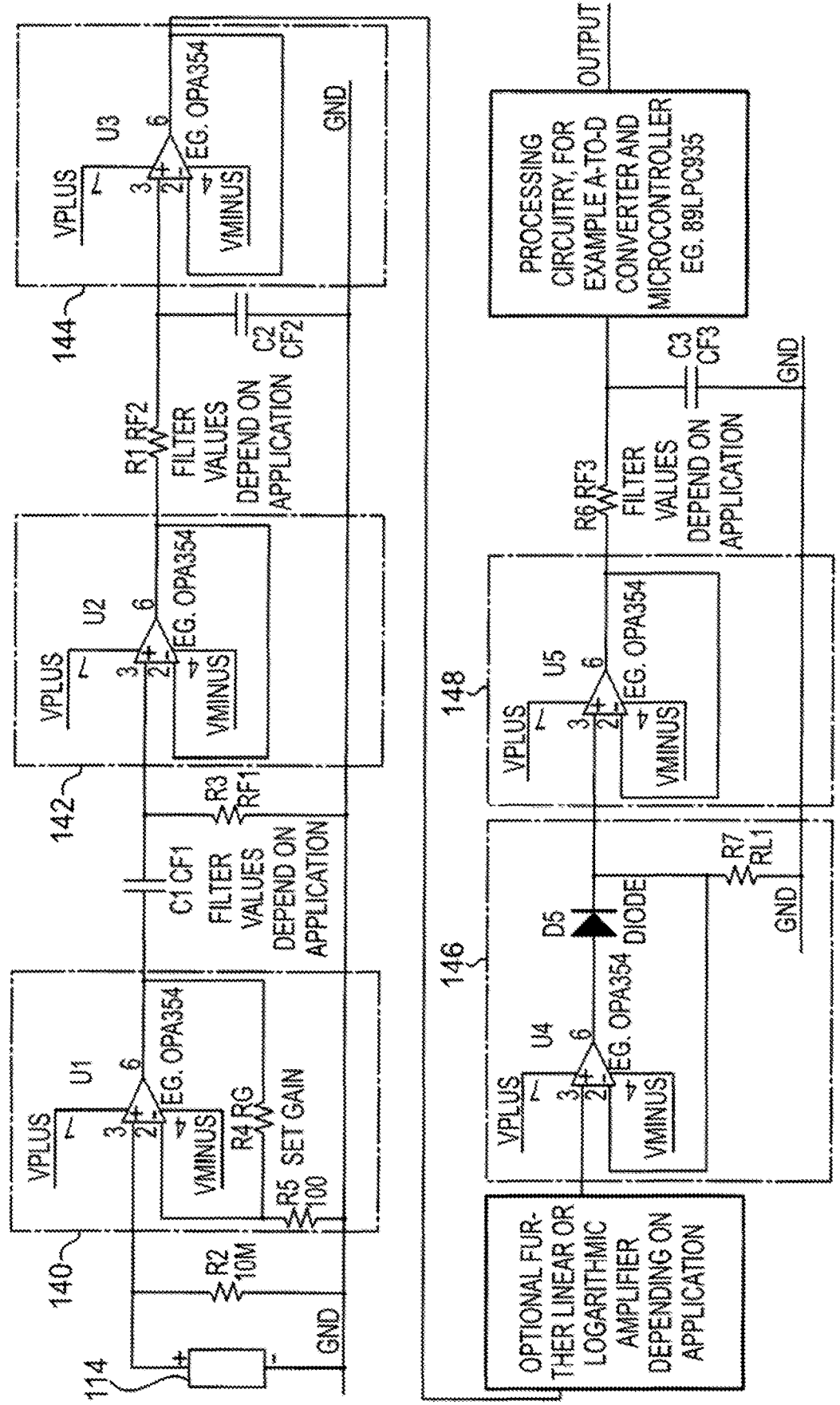
FIG. 29 is a schematic block diagram of a pre-amplification circuit for use with the sensor of FIG. 28.

Referring to FIG. 29 a schematic circuit diagram shows how the signal from the piezoelectric 114 can be conditioned before sampling. The electronics should be housed in a separate conductive housing (but which could be part of one handheld device for example) which is capable of protecting the circuit from the environment in which it is to be used. Conductivity is required to eliminate spurious EMC noise from reaching the amplification circuits. The purpose of the conditioning is to amplify the signal from the piezoelectric 114 to a level compatible with a typical digital circuit such as an analogue to digital converter, and to limit the output to the frequency range required. The output signal from the piezoelectric is passed through a variable gain pre-amplifier 140; the gain of the pre-amplifier is controlled by adjustment of resistor R4 RG as described in greater detail below. The output from the pre-amplifier 140 is passed through a high pass filter formed by a combination of CI CF1 and R3 RF1 whose values are set to pass frequencies above a selected frequency, for example 25 kHz. The signal then passes through a unity gain buffer amplifier 142 and then into a low pass filter formed by R1 RF2 and C2 CF2 whose values are set to pass frequencies below a selected frequency, for example 80 kHz. In some applications more complex filters may be required. The signal passes through another unity gain buffer amplifier 144 and then through an optional linear or logarithmic amplifier depending on the application. The signal then optionally passes through a rectifying amplifier 146, through a third unity gain buffer amplifier and then a final low pass filter formed by R6 RF3 and C3 CF3. After that, it is available to processing circuitry such as an analogue to digital converter and microcontroller (e.g. Philips 98LPC936) for analysing the output signal. In this regard the microcontroller may operate in the same way described above for the detector 10.

The invention claimed is:

1. An ultrasonic detector suitable for mounting in a position for surveying an area for a source of airborne ultrasound, said detector comprising:
   a sensor for monitoring a frequency bandwidth; and
   an alarm;
   wherein said ultrasonic detector removes an internal part of said frequency bandwidth so an unwanted ultrasonic sound signal within said frequency bandwidth does not trigger said alarm;
   wherein said sensor detects an ultrasonic sound signal within said frequency bandwidth and not in said removed part;

wherein said alarm triggers an alarm signal when said ultrasonic sound signal is detected;

wherein said ultrasonic detector determines a total alarm bandwidth of said ultrasonic sound signal as an alarm percentage of said frequency bandwidth, said total alarm bandwidth being a total frequency bandwidth of each frequency having a sound pressure level above said alarm threshold; and wherein said ultrasonic detector compares said alarm percentage to said predetermined percentage and to trigger said alarm signal when said alarm percentage is greater than said predetermined percentage.

2. The ultrasonic detector of claim 1, wherein:

said ultrasonic detector examines said frequency bandwidth for any sound pressure level above an alarm threshold; and said ultrasonic detector removes any frequency of said sound pressure level that is above said alarm threshold but below a predetermined percentage of said frequency bandwidth.

3. The ultrasonic detector of claim 1, wherein said ultrasonic detector further comprises:

a tuning circuit; and a microcontroller;

wherein said microcontroller adjusts a resonant frequency of said tuning circuit; and wherein said microcontroller examines the sound pressure level of any part of said frequency bandwidth.

4. The ultrasonic detector of claim 3, further comprising:

a timer implementing a time delay before said alarm signal is triggered;

wherein said microcontroller:

starts said time delay upon detection of any sound pressure level both above said alarm threshold and above said predetermined threshold; and trigger said alarm signal if said sound pressure is both above said alarm threshold and above said predetermined threshold at an end of said time delay.

5. The ultrasonic detector of claim 3, wherein said microcontroller:

examines each frequency of said frequency bandwidth and determine whether or not the sound pressure level at each frequency is above said alarm threshold;

if said sound pressure level at each frequency is above said alarm threshold, causes that frequency to be stored and then examines the next frequency; and if said sound pressure level at each frequency is not above said alarm threshold, does not cause the frequency to be stored and then examines the next frequency.

6. The ultrasonic detector of claim 5, further comprising an electronic filter for removing said stored frequencies from said frequency bandwidth if said total alarm bandwidth is less than said predetermined percentage.

7. An ultrasonic detector suitable for mounting in a position for surveying an area for a source of airborne ultrasound, said detector comprising:

a sensor for monitoring a frequency bandwidth; and an alarm;

wherein said ultrasonic detector removes an internal part of said frequency bandwidth so an unwanted ultrasonic sound signal within said frequency bandwidth does not trigger said alarm;

wherein said sensor detects an ultrasonic sound signal within said frequency bandwidth and not in said removed part;

wherein said alarm triggers an alarm signal when said ultrasonic sound signal is detected;

wherein said ultrasonic detector periodically monitors said frequency bandwidth so that any frequency shift of said unwanted ultrasonic sound signal is detected; and wherein said ultrasonic detector makes a corresponding shift to said part of said frequency bandwidth that is removed.

8. A method of surveying an area for a source of airborne ultrasound said method comprising:

providing an ultrasonic detector including a sensor, said sensor detecting an ultrasonic sound signal;

monitoring a frequency bandwidth for said ultrasonic sound signal;

triggering an alarm signal when said ultrasonic sound signal is detected; and during said monitoring, removing an internal part of said frequency bandwidth, whereby an unwanted ultrasonic sound signal within said frequency bandwidth does not trigger said alarm signal;

determining a total alarm bandwidth of said ultrasonic sound signal as an alarm percentage of said frequency bandwidth, said total alarm bandwidth being a total frequency bandwidth of each frequency having a sound pressure level above said alarm threshold;

comparing said alarm percentage to said predetermined percentage; and triggering said alarm signal when said alarm percentage is greater than said predetermined percentage.

9. The method of claim 8, further comprising:

examining said frequency bandwidth for any sound pressure level above an alarm threshold; and removing any frequency of said sound pressure level that is above said alarm threshold but below a predetermined percentage of said frequency bandwidth.

10. The method of claim 8, wherein said ultrasonic detector comprises:

providing a tuning circuit and a microcontroller;

said microcontroller adjusting a resonant frequency of said tuning circuit; and said microcontroller examining the sound pressure level of any part of said frequency bandwidth.

11. The method of claim 10, further comprising:

providing a timer for implementing a time delay before said alarm signal is triggered;

said microcontroller starting said time delay upon detection of any sound pressure level both above said alarm threshold and above said predetermined threshold; and triggering said alarm signal if said sound pressure is both above said alarm threshold and above said predetermined threshold at the end of said time delay.

12. The method of claim 10, further comprising:

said microcontroller examining each frequency of said frequency bandwidth and determining whether or not the sound pressure level at each frequency is above said alarm threshold;

if it is, said microcontroller causing storing of that frequency and then examining a next frequency; and if it is not, said microcontroller not causing storing of that frequency and then examining a next frequency.

13. The method of claim 12, further comprising:

providing an electronic filter; and said electronic filter removing said stored frequencies from said frequency bandwidth if said total alarm bandwidth is less than said predetermined percentage.

14. A method of surveying an area for a source of airborne ultrasound said method comprising:

providing an ultrasonic detector including a sensor, said sensor detecting an ultrasonic sound signal;

monitoring a frequency bandwidth for said ultrasonic sound signal;

triggering an alarm signal when said ultrasonic sound signal is detected; and during said monitoring, removing an internal part of said frequency bandwidth, whereby an unwanted ultrasonic sound signal within said frequency bandwidth does not trigger said alarm signal;

periodically monitoring said frequency bandwidth so to detect any frequency shift of said unwanted ultrasonic sound signal; and upon detecting said frequency shift, shifting said part of said frequency bandwidth that is removed.

* * * * *